United States Patent
Zadina et al.

(10) Patent No.: US 11,625,160 B2
(45) Date of Patent: Apr. 11, 2023

(54) CONTENT NAVIGATION METHOD AND USER INTERFACE

(71) Applicant: Google LLC, Mountain View, CA (US)

(72) Inventors: Gabrielle Zadina, San Francisco, CA (US); David Black, San Jose, CA (US); Kejia Shao, Santa Clara, CA (US); Gary Hyun Jin Kim, San Mateo, CA (US); Toni Barzic, Mountain View, CA (US); Thomas Homer Rutledge, San Jose, CA (US); Alex Newcomer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 242 days.

(21) Appl. No.: 17/247,942

(22) Filed: Dec. 31, 2020

(65) Prior Publication Data

US 2022/0206677 A1    Jun. 30, 2022

(51) Int. Cl.
G06F 3/048 (2013.01)
G06F 3/04847 (2022.01)

(52) U.S. Cl.
CPC ............... G06F 3/04847 (2013.01)

(58) Field of Classification Search
CPC ............ G06F 3/048; G06F 3/04847
See application file for complete search history.

(56) References Cited

U.S. PATENT DOCUMENTS

| | | | | |
|---|---|---|---|---|
| 7,757,182 B2 * | 7/2010 | Elliott | ............... | G06F 3/0482 715/845 |
| 8,656,300 B2 * | 2/2014 | Matthews | ............... | G06F 3/0481 715/779 |
| 9,164,671 B2 * | 10/2015 | Hilerio | ............... | H04L 67/02 |
| 9,361,132 B2 * | 6/2016 | de Souza Lima | .... | G06F 3/0481 |
| 2001/0035882 A1 * | 11/2001 | Stoakley | ............... | G06F 3/0481 715/779 |

(Continued)

FOREIGN PATENT DOCUMENTS

CN    111324398 A    6/2020

OTHER PUBLICATIONS

"File Access Panel—Recent Files Mode", Revu 2018, retrieved on Dec. 2, 2020 from https://support.bluebeam.com/online-help/revu2018/Content/RevuHelp/Menus/Window/Panels/File-Access/File-Access-Tab-in-Recent-Files-Mode-TV.htm?Highlight=file%20access, 1 page.

(Continued)

*Primary Examiner* — Rashawn N Tillery
(74) *Attorney, Agent, or Firm* — Brake Hughes Bellermann LLP

(57) ABSTRACT

Systems and methods are described that include generating a content repository to store content items satisfying a recency condition. In response to receiving an indication to access and store an additional content item in the content repository, the systems and methods may include triggering rendering of a user interface in a taskbar associated with a computer operating system, the user interface depicting at least a representation of the additional content item, storing the additional content item in the content repository, and triggering expansion of the user interface to include at least two regions where the at least two regions include a rendering of a representation of the content items satisfying the recency condition and a representation of the additional content item.

25 Claims, 22 Drawing Sheets

(56) References Cited

U.S. PATENT DOCUMENTS

| | | | |
|---|---|---|---|
| 2005/0268250 A1* | 12/2005 | Skistimas | G06F 9/45512 715/810 |
| 2006/0123159 A1* | 6/2006 | Clow | G06F 3/0481 710/48 |
| 2007/0220441 A1* | 9/2007 | Melton | G06F 16/958 715/781 |
| 2008/0055306 A1* | 3/2008 | Kwok | G06T 19/00 715/848 |
| 2009/0199122 A1* | 8/2009 | Deutsch | G06F 9/445 715/771 |
| 2011/0016418 A1* | 1/2011 | Fujita | G06F 3/0486 715/769 |
| 2011/0138314 A1* | 6/2011 | Mir | G06F 9/452 715/779 |
| 2011/0307811 A1* | 12/2011 | Kim | G06F 3/04842 715/760 |
| 2012/0066630 A1* | 3/2012 | Kim | G06F 3/0488 715/810 |
| 2012/0066645 A1* | 3/2012 | Laurie | G06F 16/954 715/811 |
| 2012/0084713 A1* | 4/2012 | Desai | G06F 9/452 715/788 |
| 2012/0166956 A1* | 6/2012 | Hilerio | G06F 9/44505 715/734 |
| 2012/0296959 A1* | 11/2012 | Momchilov | H04L 67/303 709/203 |
| 2013/0057572 A1* | 3/2013 | Anderson | G06F 9/451 345/619 |
| 2014/0195963 A1* | 7/2014 | Cheung | G06F 30/00 715/838 |
| 2015/0149927 A1* | 5/2015 | Walkin | H04N 5/23293 715/752 |
| 2015/0286350 A1* | 10/2015 | Gu | H04L 67/025 715/779 |
| 2017/0004113 A1* | 1/2017 | Gore | G06F 40/109 |
| 2017/0048117 A1* | 2/2017 | Tsuchiya | H04L 67/34 |
| 2019/0222632 A1* | 7/2019 | He | G06F 9/451 |
| 2019/0347181 A1* | 11/2019 | Cranfill | G06F 21/629 |
| 2021/0342785 A1* | 11/2021 | Mann | G06F 40/18 |
| 2022/0206995 A1* | 6/2022 | Zadina | G06F 16/168 |

OTHER PUBLICATIONS

Tursunovic, "Dropover User Guide", retrieved on Dec. 2, 2020 from https://dropoverapp.com/manual, 9 pages.

* cited by examiner

CONTENT NAVIGATION METHOD AND USER INTERFACE

BACKGROUND

Conventional applications may provide access to a most recent copied text. For example, a user may use a command to copy text to generate the most recent copied text used in an application. When the most recent copied text is processed by the application, a user may use a command to paste the text. In response to receiving the paste command, the most recent copied text may be imported into a selected location of the application. Such conventional most recent copied text may be accessed without the use of an application user interface.

SUMMARY

The systems and methods described herein may function to generate a quick-access user interface (UI) that functions as a temporary holding space for enabling a user to quickly save, access, and drag recently accessed content items from one application (e.g., app, document, online app, or online document, etc.) to another such application. Such content items may be populated in the UI and moved from the UI to other locations associated with, for example, O/S file system/folders, cloud drive folders, online areas, and/or apps (e.g., browser windows/tabs, documents, image apps, screenshot apps, email apps, etc.). The UI may be presented by the O/S from a taskbar (e.g., shelf, ribbon, toolbar, dock, panel, tray, launch bar, etc.). The UI may include defined regions for depicting content items. A visual preview of content items that are populated in the UI may be provided (e.g., in a taskbar) and may be mutable and minimizable.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer-implemented method is described, a computer-implemented method includes generating a content repository to store content items satisfying a recency condition. In response to receiving an indication to access and store an additional content item in the content repository, the method may include triggering rendering of a user interface in a taskbar associated with a computer operating system, the user interface depicting at least a representation of the additional content item, storing the additional content item in the content repository, and triggering expansion of the user interface to include at least two regions, the at least two regions including a rendering of a representation of the content items satisfying the recency condition and a representation of the additional content items according to predefined settings.

Implementations can include any or all of the following features. In some implementations, satisfying the recency condition includes detecting that a respective content item in the content items is detected to be stored within a predefined time threshold and the predefined time threshold for the recency condition is configurable. In some implementations, the predefined settings include a first setting associated with a first region of the at least two regions, the first setting enabling access to the additional content items and a clipboard associated with the computer operating system to retrieve and render a portion of content items associated with the clipboard and a second setting associated with a second region of the at least two regions, the second setting enabling access to the content repository to retrieve and render the content items satisfying the recency condition. In some implementations, the user interface is rendered and maintained as viewable while accessing one or more of the applications executing in the computer operating system.

In some implementations, the at least two regions include at least a first region depicting the additional content item in response to detecting that the additional content item is requested to be pinned to the user interface and a second region depicting the additional content item in response to detecting that the additional content item includes a recent screen capture or a recent data download.

In some implementations, the user interface is removed from view in response to detecting a select and drag operation for at least one content item associated with the user interface and the user interface reappears in view, in response to detecting a release of the at least one content item associated with the user interface. In some implementations, the content items satisfying the recency condition and the additional content item are configured to be selectable from the user interface to be provided as input into a document, an online document, or an application.

In some implementations, the received indication to access and store additional content item in the content repository includes a selection from a context menu of at least one of the applications executing in the computer operating system, the context menu being modified, based on the indication and by the computer operating system, to provide an option to select to store the additional content item in the content repository. In some implementations, the indication to access and store content includes a triggered drag-and-drop command, a triggered screen capture, a triggered image capture, or a triggered data download.

In some implementations, the method may include removing content items associated with the user interface upon detecting expiration of a predefined time threshold and an indication to end a user session with the computer operating system. In some implementations, the method may include persisting a particular rendered content item in the user interface upon detecting a change in a file path associated with the particular rendered content item. Responsive to receiving additional indications to store different content items, generating and depicting, for each indication, an additional representation of the respective different content items, wherein each additional representation is generated to overlay a portion of at least one of a previously rendered representations.

In some implementations, the content item and the additional content item are rendered in the user interface according to a temporal proximity of a copy operation or a cut operation associated with capturing the content item or the additional content item. In some implementations, the content item and the additional content item are grouped in the user interface according to a detected object represented in the content items associated with the user interface.

In a second general aspect, a non-transitory computer-readable storage medium comprising instructions stored thereon that, when executed by at least one processor, are configured to cause a computing system to carry out instructions that include generating a content repository to store content items satisfying a recency condition, the content repository being modifiable by a computer operating system, but restricted to reading operations by applications executing in the computer operating system. In response to receiving an indication to access and store an additional content item in the content repository, the instructions may include triggering rendering of a user interface in a taskbar associated with the computer operating system, the user interface depicting at least a representation of the additional content item, storing the additional content item in the content repository, and triggering expansion of the user interface to include at least two regions, the at least two regions including a rendering of a representation of the content items satisfying the recency condition and a representation of the additional content item.

Implementations can include any or all of the following features. In some implementations, satisfying the recency condition includes detecting that a respective content item in the stored content items is detected to be stored within a predefined time threshold, where the predefined time threshold for the recency condition is configurable.

In some implementations, the at least two regions include at least a first region depicting the additional content item in response to detecting that the additional content item is requested to be pinned to the user interface and a second region depicting at the additional content item in response to detecting that the additional content item includes a recent screen capture or a recent data download.

In some implementations, the user interface is removed from view in response to detecting a select and drag operation for at least one content item associated with the user interface and the user interface reappears in view, in response to detecting a release of the at least one content item associated with the user interface.

In some implementations, the content items satisfying the recency condition and the additional content item are configured to be selectable from the user interface to be provided as input into a document, an online document, or an application. In some implementations, the content item and the additional content item are grouped in the user interface according to a temporal proximity of a copy operation or a cut operation associated with capturing the content item or the additional content item. In some implementations, the content item and the additional content item are grouped in the user interface according to a detected object represented in the content items associated with the user interface. In some implementations, the indication to access and store content includes a triggered drag-and-drop command, a triggered screen capture, a triggered image capture, or a triggered data download.

In a third general aspect, a computing system is described that includes memory and at least one processor coupled to the memory, the at least one processor being configured to trigger the system to operate a user interface module configured to generate a content repository to store content items satisfying a recency condition and in response to receiving an indication to access and store an additional content item in the content repository: trigger rendering of a user interface in a taskbar associated with a computer operating system, the user interface depicting at least a representation of the additional content item, store the additional content item in the content repository, and trigger expansion of the user interface to include at least two regions, the at least two regions including a rendering of a representation of the content items satisfying the recency condition and a representation of the additional content item.

Implementations can include any or all of the following features. In some implementations, satisfying the recency condition includes detecting that a respective content item in the stored content items is detected to be stored within a predefined time threshold, and wherein the predefined time threshold for the recency condition is configurable. In some implementations, the user interface is rendered and maintained as viewable while accessing one or more applications executing in the computer operating system.

In some implementations, the at least two regions include at least a first region depicting the additional content item in response to detecting that the additional content item is requested to be pinned to the user interface and a second region depicting the additional content item in response to detecting that the additional content item includes a recent screen capture or a recent data download.

In some implementations, the user interface is removed from view in response to detecting a select and drag operation for at least one content item associated with the user interface and the user interface reappears in view, in response to detecting a release of the at least one content item associated with the user interface.

The systems and aspects above may be configured to perform any combination of the above-described aspects, each of which may be implemented together with any suitable combination of the above-listed features and aspects.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

The use of similar or identical reference numbers in the various drawings is intended to indicate the presence of a similar or identical element or feature.

DETAILED DESCRIPTION

Figure 1:
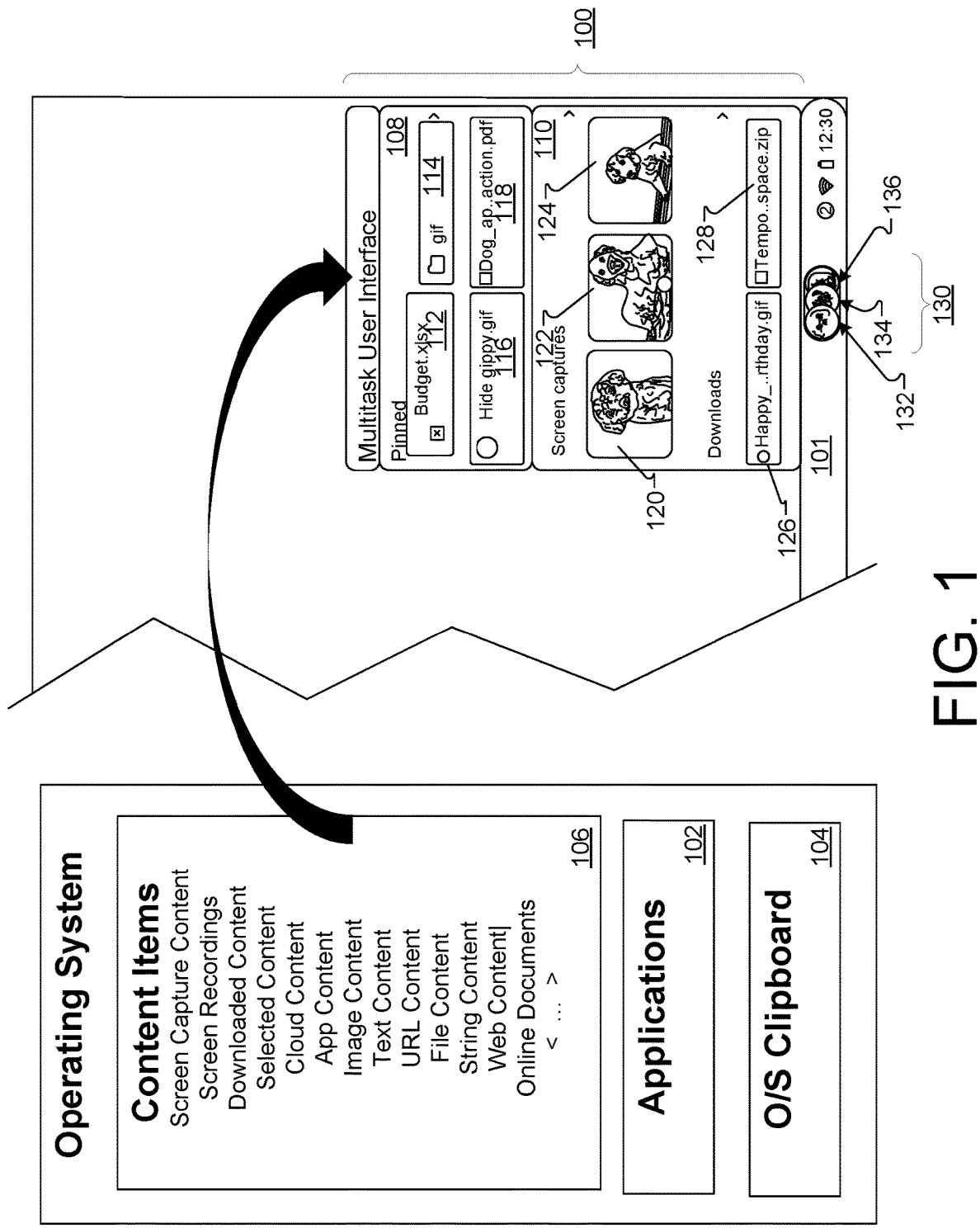
FIG. 1 is a block diagram illustrating an example use of a multitask user interface (UI), in accordance with implementations described herein.

This document describes a system-level user interface (UI) surface to provide quick access to recent and user-determined important content items. The system-level UI may be a multitask UI with access to a content repository that was previously curated by a user accessing and storing content items on a computing system. The multitask UI may provide any number of content items including, but not limited to files, screenshots (e.g., screen captures), downloads, clips, snippets, GIFs, application content, text content, web content (e.g., text, images, URLs), and portions thereof.

In some implementations, the multitask UIs described herein may function in at least two modes to save content items for quick access. A first mode may allow a copy/paste history for a recent predetermined number of content items saved within a predetermined time period. A second mode may allow for explicit storage through drag-and-drop operations, paste operations, and/or other click or selection shortcut commands to explicitly store the content items.

A visual preview of content in the multitask UI may be provided in a taskbar, for example, to enable users to identify particular content stored in the UI without having to use up screen real estate with a full-featured UI. The preview region and multitask UI may be mutable in that a user can set permissions for how the preview region, the multitask UI, and the content items associated with both are depicted or hidden. In operation, the multitask UI may be generated and presented by the O/S on the O/S taskbar (e.g., shelf, ribbon, toolbar, dock, panel, tray, launch bar, etc.). A user may access the multitask UI from the taskbar via a shortcut, a copy or cut operation, a selection on the UI or content items in the UI, or via a menu selection.

In one non-limiting example, the UI may include at least two defined regions for depicting content items. For example, a first region may represent a contained or grouped region of the multitask UI that renders user-pinned content. For example, a user may specifically choose to save particular content items to a pinned area of the multitask UI. Pinned content items may be stored, rendered, and/or otherwise interacted with using a different set of permissions and/or rules than the content items stored as recently saved content. In general, pinned content items may be rendered in a persistently pinned area of content items provided in the multitask UI. A second container may represent a contained or grouped region of the multitask UI that includes recently saved content (e.g., downloads, screen captures, files, copied web content, etc.). The recently saved content may be saved directly to the multitask UI in addition to being saved at other locations (e.g., download folders, clipboards, etc.).

The multitask UIs described herein allow the user to easily view and use previously accessed content without searching through a files app or a cluttered desktop UI. In addition, the UIs described herein enable storage of file content, image content, web content, etc., without disrupting the storage configuration of an original file such that users may access the content without breaking a file structure configured for content stored on a computing system. For example, in conventional systems, a user may copy a file (from a project folder of files) to the desktop UI to have quick access to the file, which results in two copies of the file on the computing system. To avoid duplication of stored content, the multitask UIs described herein may provide the advantage of allowing a user to instead store temporary content items and to "pin" often-used content items to the multitask UI in order to retrieve content quickly without having to perform a search for the content.

The multitask UIs described herein may also provide an advantage of allowing users to avoid file, document, and/or application window rearrangement in order to access files below such files, documents, and windows. For example, because the multitask UIs described herein are provided at the taskbar and O/S, level, the UIs may be floated over content, retrieved from a viewable area (e.g., the task bar), and/or otherwise shown via preview in the viewable area. That is, the multitask UIs described herein provide access to recently accessed content and user-indicated content on the top of the display screen, instead of at the back as in conventional methods, which involve the user minimizing or moving all windows in order to carry out drag-and-dropping operations to access the content.

The multitask UIs described herein may also provide an advantage of quick (e.g., at a glance) access to recently used (or accessed or captured) content items (e.g., screen captures and recent images downloaded to a computing system). In addition, the multitask UIs may enable a preview of such content, which may provide a user a quick visual rendering of what the recent content items may include. For example, the multitask UI may provide a visual preview of multiple recent images in the task bar (e.g., shelf). In some implementations, the visual preview may be stacked to reveal additional visual previews such that the visual previews are saleable to work with a single content item or any number of content items. Previews may be disabled by the user for particular proprietary content or personal photos, etc., to avoid having previews depicted in a task bar.

The systems and methods herein may solve the technical challenge (e.g., problem) of finding recently used content items for a particular user or user session. For example, users may not know where or how to retrieve previously captured screenshots and downloaded files. Often users may intend to use the screenshots (e.g., screen captures) immediately, but may instead wish to copy, paste, capture a few other screenshots (e.g., images, snippets, screen captures, etc.) before using the screenshots. A solution is needed to provide a set of curated, organized recent screenshots, downloads, and/or other content items deemed important by the user.

The systems and methods described herein provide a technical solution to the technical problem by using the underlying O/S to generate a repository and UI that may be curated as the user gathers, stores, and works with recently accessed and/or used content items (e.g., files, apps, cloud content, web content, or other online or offline content items). As an alternative to conventional systems, which typically provide the user with a desktop screen to store important content that the user manually manages, the solutions described herein enable a multitask UI that gathers, curates, maintains, and self manages recent content items while the user adds content items to the UI and/or associated repository. The multitask UI may be provided in a topmost layer of the application window. In some implementations, the multitask UI may be presented to a user as a persistent overlay such that the UI is easily accessible at all times.

The technical solutions described herein may provide a technical effect of improved content management, improved content access, and improved UI interactions. For example, the multitask UIs described herein may be widely adapted to a variety of devices including small devices such as wearables and mobile devices as well as larger devices including laptops, desktops, etc. The UIs described herein may provide for easy access to content items that more accurately represent user needs. The UIs described herein may also provide automatic UI adaption to enable an update of UI content items and/or behavior without depending upon explicit user instruction.

FIG. 1 is a block diagram illustrating an example use of a multitask UI 100, in accordance with implementations described herein. The multitask UI 100 originates from a taskbar 101. The UI 100 is generated and rendered by an operating system of a computing device providing the taskbar 101. The multitask UI 100 may include any number of content items populated by a user during a user session. For example, a user may be accessing any number of applications 102 throughout a user session and may copy (e.g., capture, snip, download, etc.) content items into a clipboard, such as O/S clipboard 104 and/or another storage location, such as content items 106.

The content items 106 may represent a content repository that stores content items satisfying a recency condition (e.g., conditions 257) and items that a user has deliberately requested to be pinned to the UI 100. In general, the content repository storing content items 106 may be modifiable by a computer O/S, but may be restricted to reading access operations by applications executing in the computing operating system including browsers, online accessible content, native apps, and web apps. In some implementations, the content items 106 may represent a combination of content items representing items that are stored or pinned to be stored in repository that may exceed the recency condition based on a user request or system-generated rule to retain the content items for a longer period than the recency condition. For example, a user may pin content items into UI 100 to ensure that the pinned content items are retained beyond the recency condition. The pinned content may be retained for a session, a predefined time period, one session after the predefined time period, and the like.

In some implementations, the expansion of the UI 100 may occur according to predefined settings. For example, predefined settings may include a first setting and as second setting. The first setting may enable access to additional content items and a clipboard associated with the O/S to retrieve and render a portion of content items associated with the clipboard. The second setting may enable access to the content repository to retrieve and render the content items satisfying the recency condition.

In some implementations, the systems described herein may access and leverage content from the O/S clipboard 104 to generate the content items in the multitask UI 100. For example, the O/S of a computing device may leverage the O/S clipboard 104 in order to populate content into an example UI 100. In some implementations, the systems described herein may instead use the content repository to populate the multitask UI 100 as a user accesses content items 106.

As shown, the content items 106 include, but are not limited to, screen capture content, screen recordings, downloaded content, selected content, cloud content, app content, image content, text content, URL content, file content, string content, web content, and online documents, just to name a few examples. The content items 106 may include elements that are stored as a user cuts, copies, selects to add, and/or downloads content into the UI 100. The UI 100 may represent O/S generated content that allows users to curate content items in order to later access the content items for pasting into other documents and/or applications. In some implementations, the multitask UI 100 may be used to populate the O/S clipboard 104 with content items, which may be accessed from the O/S clipboard 104 at a later time.

The content items 106 may be stored by the systems described herein via copy operations, cut operations, snip or crop operations, drag-and-drop operations, download operations, and the like. In particular, the content items 106 may be copied to the O/S clipboard 104, which may in turn, trigger the O/S of the computing system to also place access to the content item into content items 106. In some implementations, content items 106 may be stored into the repository and surfaced to be populated in the multitask UI 100 when a user opens a file application (e.g., a file tree, a file browser, a directory browser, etc.) and selects to have one or more content items populated in the UI 100.

As shown, the multitask UI 100 includes at least two regions expanded from the taskbar 101 and stacked on top of one another. The at least two regions may be used to populate content items. For example, a pinned content region 108 may be configured to allow a user to choose to pin files from the computing system into the multitask UI 100. Such files may not follow the same rules as screen captures and downloaded items in the UI 100, as the pinned content region 108 may persist the files stored in this section. Pinning a file may indicate that the user may wish to keep the file content item accessible for a longer period of time than typical copied and downloaded content items. In addition, content items such as online documents, web content, URLs, and the like may also be placed into the pinned content region 108.

A second region may include a screen capture and downloads content region 110. The region 110 may enable access to additional content items through a clipboard associated with the O/S (e.g., O/S clipboard 104). In some implementations, the region 110 may be populated with recent screen captures and/or recent downloads. Unlike the pinned content region 108, the downloads and content region 110 may be automatically cleaned according to a predetermined time schedule. Because screen captures and downloads may be utilized within a session or two of gathering such content items, the data may be less important to a user over time. Thus, the systems and/methods described herein may perform a data clean of region 110 to ensure less clutter in the UI 100. The predetermined time schedule may be system configured or user configured. For example, the system or the user may configure the time schedule for automatic data cleaning to be two to three user sessions, one to two weeks, two to four weeks, three to five days, and/or any amount of time. In some implementations, a cleaning schedule may include the predetermined time schedule plus one user session to ensure the user does not lose content mid-session.

As shown in FIG. 1, the pinned content region 108 includes a budget file 112, an image file 114, an image file 116, and a pdf file 118. Additional files may be pinned to pinned content region 108 and may be scrolled within the region using scrolling controls. The screen captures and downloads content region 110 includes a screen capture image 120, a screen capture image 122, and a screen capture image 124, each of which was captured as a screenshot by a user. The downloads in region 110 include an image file 126 and a zip file 128, each of which was downloaded by the user. Region 110 may also include scrolling controls to scroll through populated content items.

The multitask UI includes a preview region 130 that is included in the taskbar 101. In some implementations, the preview region 130 may be shown instead of the full multitask UI 100. The preview region 130 includes a visual preview of content in the multitask UI 100. The preview region 130 shown here includes content bubbles 132, 134, and 136 indicating three of the images in UI 100. In some implementations, the preview region 130 includes a preview for each item in UI 100. In some implementations, the preview region 130 includes two or more of the recently populated content items into UI 100.

Figure 2A:
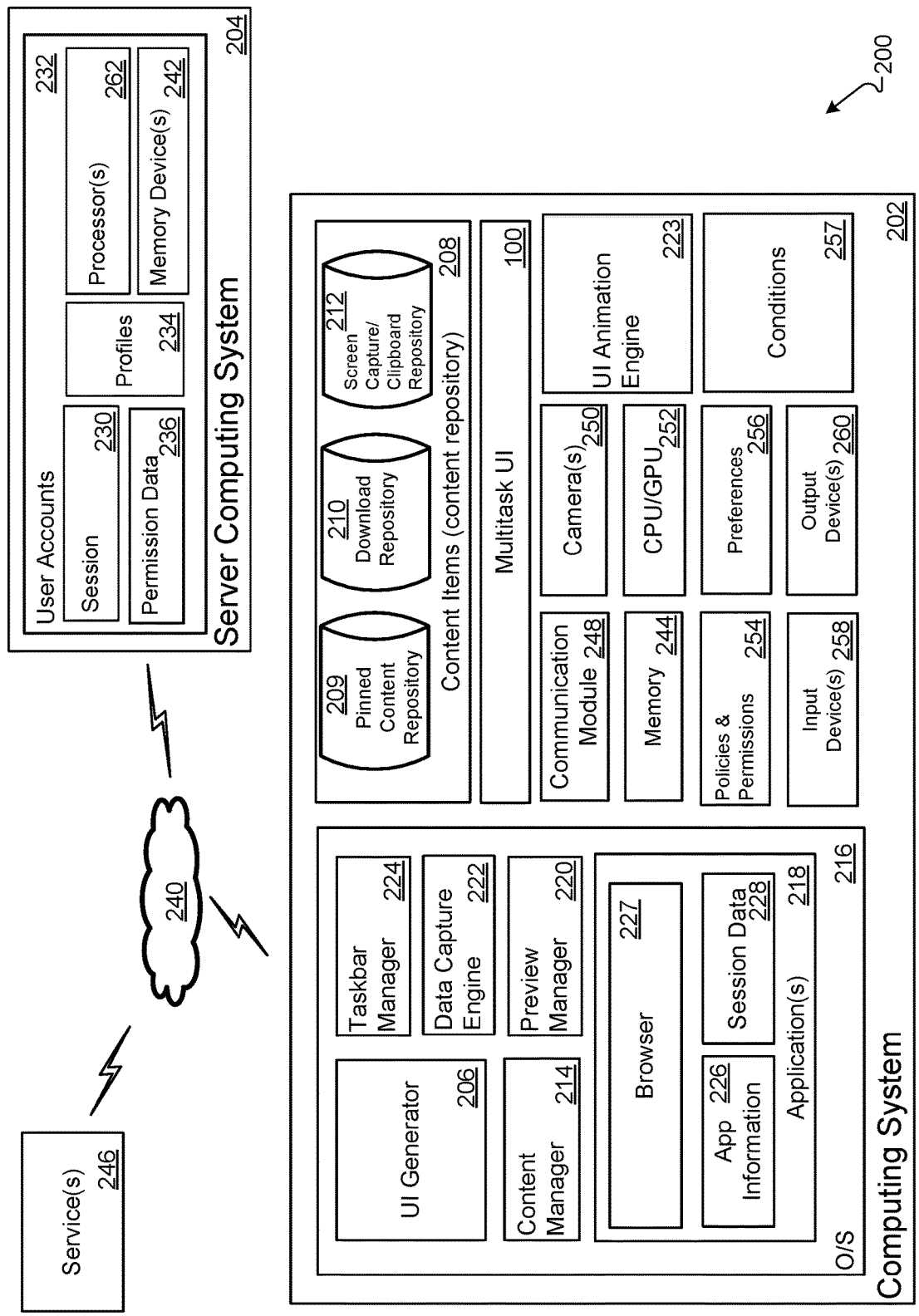
FIGS. 2A-2B are block diagrams illustrating an example computing system configured to generate and populate the multitask UI, in accordance with implementations described herein.

FIG. 2A is a block diagram illustrating an example computing system 200 configured to generate and populate the multitask UI 100, in accordance with implementations described herein. The system 200 may be used to configure computing devices (e.g., a computing system 202 and a server computing system 204), and/or other devices (not shown in FIG. 2A) to operate the multitask UI 100. For example, system 200 may generate the multitask UI 100 using a UI generator 206 from content items 208 such as pinned content repository 209, download repository 210 and/or screen capture/clipboard repository 212. In some implementations, the content items 208 may be obtained from an application associated with the computing system 202. In some implementations, the content items 208 may be obtained directly from a copy, cut, or download operation. The content items 208 may be modified by a content manager 214, for example, in order to accurately depict visual UI data in the multitask UI 100.

As shown in FIG. 2A, the computing system 202 includes an operating system (O/S) 216. The O/S 216 may execute and or otherwise manage applications 218, UI generator 206, content manager 214, preview manager 220, data capture engine 222, and taskbar manager 224. The O/S 216 may function to execute and/or control applications, UI interactions, accessed services, and/or device communications that are not shown.

The applications 218 may be any type of computer program that can be executed/delivered by the computing system 202 (or server computing system 204 or via an external service). Applications 218 may provide a user interface (e.g., application window) to allow a user to interact with the functionalities of a respective application 218. The application window of a particular application 218 may display application data along with any type of controls such as menu(s), icons, widgets, etc. The applications 218 may include or have access to app information 226 and session data 228, both of which may be used to generate content and/or data and provide such content and/or data to the users and/or the O/S 216 via a device interface. The app information 226 may correspond with information being executed or otherwise accessed by a particular application 218. For example, the app information 226 may include text, images, control signals associated with input, output, or interaction with the application 218. In some implementations, the app information 226 may include download data from pinned content repository 209, download data from download repository 210, and/or screen capture/clipboard data from repository 212. In some implementations, the app information 226 may include data associated with a particular application 218 including, but not limited to metadata, tags, timestamp data, URL data, and the like. In some implementations, the applications 218 may include a browser 227. The browser 227 may be utilized by multitask UI generator 206 to configure content items 208 for presentation in UI 100.

The session data 228 may pertain to a user session 230 with an application 218. For example, a user may access a user account 232 via a user profile 234 on or associated with the computing system 202, or alternatively via server computing system 204. Accessing the user account 232 may include providing a username/password or other type of authentication credential and/or permission data 236. A login screen may be displayed to permit the user to supply the user credentials, which, when authenticated, allows the user to access the functionalities of the computing system 202. The session may start in response to the user account 232 being determined as accessed or when one or more user interfaces (UIs) of the computing system 202 are displayed. In some implementations, a session and a user account may be authenticated and accessed using computing system 202 without communicating with server computing system 204.

In some implementations, the user profiles 234 may include multiple profiles for a single user. For example, a user may have a business user profile and a personal user profile. Both profiles may utilize the same clipboard history UI 100 in order to use content items stored from both user profiles. Thus, if a user has a browser session open with a professional profile and an online file or application open with a personal user profile, the multitask UI 100 may be used to store content items clipped, downloaded, cut, copied, etc., from both profiles. For example, the system 200 may provide the user a view of the multitask UI 100 where content items rendered in the UI 100 are retrieved from the two user profiles associated with a user with access to the UI 100.

During the session (and if authorized by the user), session data 228 is generated. The session data 228 includes information about session items used/enabled by the user during a particular computing session 230. The session items may include clipboard content, browser tabs/windows, applications (e.g., web applications, native applications), virtual desks, display states (or modes) (e.g., split screen, picture-in-picture, full screen mode, etc.), and/or other graphical control elements (e.g., files, windows, control screens, etc.). For example, during the session 230, a user may collect a number of downloads, files, screen captures, and/or other content items. The session items can include the downloads, files, screen captures, and/or other content items. Such session items may be stored in a repository for provision in the multitask UI 100, for example, for the length of the session. In some implementations, the session items may be stored longer than a length of a session based on a predetermined time period. For example, the session items may be stored, based on user permission data 236 for two to five days, one to four weeks, and the like. In some implementations, the session items may be stored for the predetermined time period with the addition of a current session. For example, to avoid removing session items during a session, the O/S 216 may store the session items for the length of the predetermined time period unless a user is currently in a session, in which case, the O/S 216 may wait until the end of the session to remove items from the session items.

As the user launches, enables, and/or manipulates these session items on the user interface, session data 228 is generated. The session data may include an identification of which session item has been launched, configured, or enabled, window positions, window sizes, whether a session item is positioned in the foreground or background, whether a session item is focused or non-focused, the time in which the session items was used (or last used), and/or a recency or last appearance order of the session items. In some examples, the session data 228 may include session item assignment to a particular multitask UI region.

In some examples, the session data 228 is transmitted, over a network 240, to the server computing system in which the data may be stored in memory 242 in association with the user account 232 according to user permission data 236 of the user at the server computing system 204. For example, as the user launches and/or manipulates a session item on the user interface of the computing system 202, session data about the session items may be transmitted to the server computing system 204. In some implementations, session data 228 is instead (or also) stored within a memory device 244 on computing system 202.

The UI generator 206 may generate content item representations for rendering in a multitask UI (e.g., multitask UI 100). The UI generator 206 may perform searches, content item analysis, browser process initiation, and other processing activities to ensure content items are accurately and efficiently rendered within a particular region or order in the multitask UI 100. For example, the generator 206 may determine how particular content items are depicted in the UI 100. In some implementations, the generator 206 may add formatting to content items. In some implementations, the generator 206 may remove formatting from content items.

In general, the UI generator 206 may function to generate the UI 100 as a quick-access UI element in a taskbar that functions as a temporary holding space and enables a user to quickly save and access files (such as images, text, links, screen captures, downloads, etc.) for an ongoing task from anywhere without having to perform multiple switching of windows. The accessed files may be used for creating a document, a blog, a slide, an email, a mock, a drawing, or other task that uses and/or generates content items.

The preview manager 220 may be configured to manage the preview regions described herein. The preview regions may include any number of thumbnails depicting a preview of a particular content item populated in UI 100, for example. In some implementations, the preview regions described herein may be animated to increase a user's ability to discover the regions. The preview manager 220 may manage and execute such animations. Example animations can include movable, rolling, stacking, or other transition motion to depict a particular number of preview content items in the taskbar. The choreography of the animation may depend on a number of preview content items being depicted, a number content items being added to the preview content items, a number of duplicate preview content items, and/or a position of such duplicate preview content items.

In some implementations, animations can occur for any of the UIs (or portions of the UIs) described herein. For example, when transitioning onto the taskbar, the preview region may jump up (e.g., quickly move upward) while scaling (e.g., from small to large, thin to wide, etc.), then may drop down with a single overshoot and then may expand the width of the preview region, based on content items within the region, as the animation causes the review region to come to rest in a final position within the taskbar. In some implementations, when the preview region transitions onto the taskbar, the region may move upward vertically from an initial resting taskbar location while scaling and then may move downward vertically past the initial resting position and may then move up vertically while expanding horizontally.

In another example, the preview region may include content bubbles. When new content bubbles are added to the preview region, existing content bubbles may be moved horizontally and/or faded out as the preview region expands horizontally. New content bubbles may move down vertically past a final position of the preview region and then may move up vertically to the final position to animate a region expansion or contraction where existing content bubbles shift to make room for additional content bubbles. New content bubbles drop into a container of the preview region with a single overshoot animation.

The content manager 214 may function to manage content items in clipboard history UI 100. In some implementations, the content manager 214 may function with the preview manager 220 to manage the look and feel of elements displayed in preview region 130.

The UI animation engine 223 may be configured to provide the UI 100 in varying states depending on the mode of access, the applications in use, and/or based on user permissions 254 and preferences 256 and system conditions. In some implementations, the UI animation engine 223 may function with content manager 214 and preview manager 220 to generate animation effects for content, UI 100, and preview regions depicted in the taskbar.

In some implementations, the UI animation engine 223 may be configured to expand and collapse the multitask UI 100. In some implementations, the UI animation engine 223 may be configured to enable and execute motion updates responsive to users rearranging pined files, screen captures, and/or downloaded content items within the UI 100.

Among other O/S based operations and controls, the taskbar manager 224 may determine when to depict a preview region 130 of multitask UI 100. In addition, the taskbar manager 224 may determine when to also depict full multitask UI 100 and which regions of UI 100 to render. In some implementations, the taskbar manager 224 may also function with UI animation engine 223 to expand or shrink preview regions 130 and/or multitask UI 100.

The data capture engine 222 may provide copy and paste operations via the O/S clipboard 104 and via the multitask UI 100. The engine 222 may store and map data from stored files to captured content items.

As shown in FIG. 2A, the O/S 216 may include or have access to services 246, a communication module 248, cameras 250, memory 244, and CPU/GPU 252. The computing system 202 may also include or have access to policies and permissions 254 and preferences 256. In addition, the computing system 202 may also include or have access to input devices 258, and/or output devices 260.

The services 246 may include online storage, content item access, account session or profile access, permissions data access, and the like. In some implementations, the services 246 may function to replace server computing system 204 where the user information and accounts 232 are accessed via a service. Similarly, the multitask UI 100 may be accessed via services 246.

The cameras 250 may include one or more image sensors (not shown) that may detect changes in background data associated with a camera capture performed by computing system 202 (or another device in communication with computing system 202). The cameras 250 may include a rear-facing capture mode and a front-facing capture mode.

The computing system 202 may generate and/or distribute particular policies and permissions 254 and preferences 256. The policies and permissions 254 and preferences 256 may be configured by a device manufacturer of computing system 202 and/or by the user accessing system 202. Policies 254 and preferences 256 may include routines (i.e., a set of actions) that trigger based on an audio command, a visual command, a schedule-based command, or other configurable command. For example, a user may set up a particular UI to be displayed responsive to a particular action. In response to detecting such an action, system 202 may display the UI. Other policies 254 and preferences 256 may of course be configured to modify and or control content associated with system 202 configured with the policies and permissions 254 and/or preferences 256.

The input devices 258 may provide data to system 202, for example, received via a touch input device that can receive tactile user inputs, a keyboard, a mouse, a hand controller, a mobile device (or other portable electronic device), a microphone that can receive audible user inputs, and the like. The output devices 260 may include, for example, devices that generate content for a display for visual output, a speaker for audio output, and the like.

In some implementations, the computing system 202 may store particular application and/or O/S data in a repository. For example, pinned content may be stored in the pinned content repository 209, downloads may be stored in the download repository 210 upon receiving a cut, clip, or copy operation from a user of system 202. Similarly, screen captures and clipped content items may be stored in the clipboard repository 212 upon receiving a cut, clip, or copy operation from a user of system 202.

The server computing system 204 may include any number of computing devices that take the form of a number of different devices, for example a standard server, a group of such servers, or a rack server system. In some examples, the server computing system 204 may be a single system sharing components such as processors 262 and memory 242. User accounts 232 may be associated with system 204 and session 230 configurations and/or profile 234 configurations according to user permission data 236 may be provided to system 202 at the request of a user of the user account 232, for example.

The network 240 may include the Internet and/or other types of data networks, such as a local area network (LAN), a wide area network (WAN), a cellular network, satellite network, or other types of data networks. The network 240 may also include any number of computing devices (e.g., computer, servers, routers, network switches, etc.) that are configured to receive and/or transmit data within network 240. Network 240 may further include any number of hardwired and/or wireless connections.

The server computing system 204 may include one or more processors 262 formed in a substrate, an operating system (not shown) and one or more memory devices 242. The memory devices 242 may represent any kind of (or multiple kinds of) memory (e.g., RAM, flash, cache, disk, tape, etc.). In some examples (not shown), the memory devices 242 may include external storage, e.g., memory physically remote from but accessible by the server computing system 204. The server computing system 204 may include one or more modules or engines representing specially programmed software.

In general, the computing systems 202 and 204 may communicate via communication module 248 and/or transfer data wirelessly via network 240, for example, amongst each other using the systems and techniques described herein. In some implementations, each system 202, 204 may be configured in the system 200 to communicate with other devices associated with system 200.

Figure 2B:
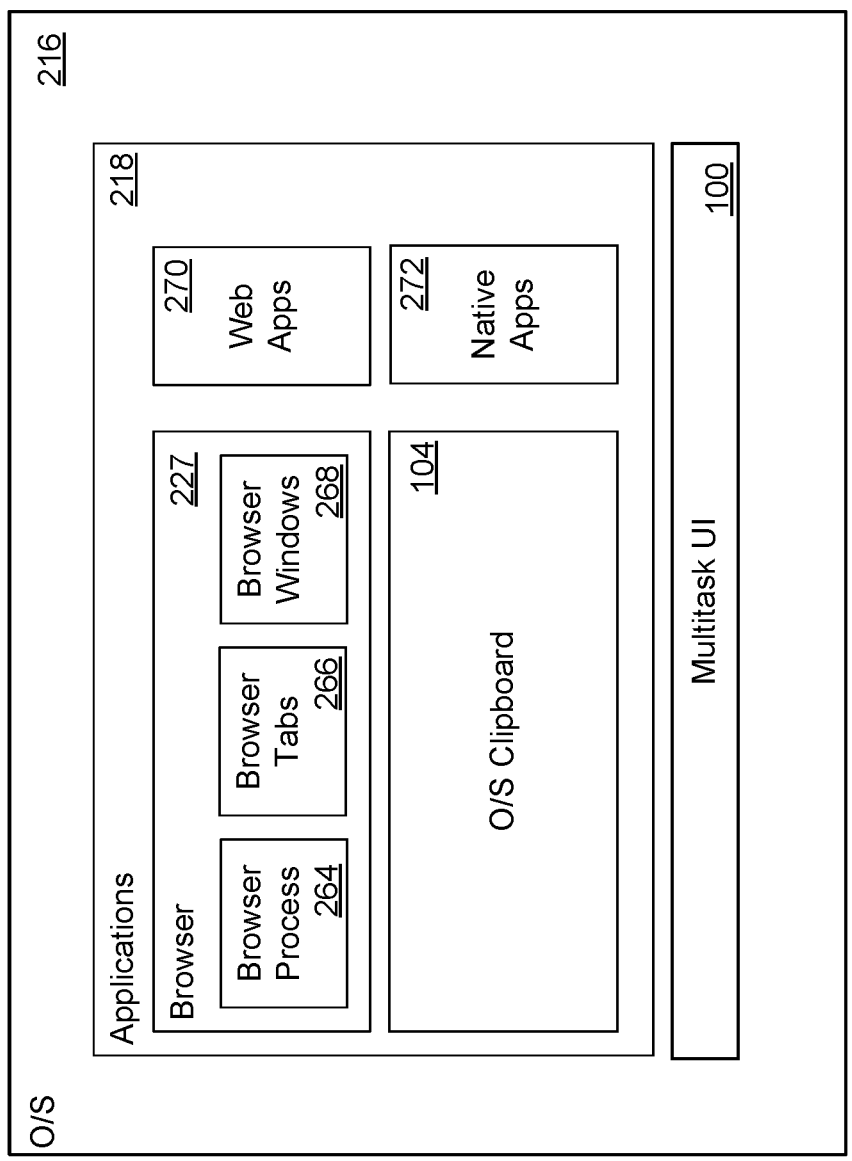

As shown in FIG. 2B, the O/S 216 includes the multitask UI 100 and additional applications 218. For example, the applications 218 may also include the browser 227. A browser 227 represents a web browser configured to access information on the Internet. The browser 227 may launch one or more browser processes 264 to generate browser content or other browser-based operations. The browser 227 may also launch browser tabs 266 in the context of one or more browser windows 268. The applications 218 may include web applications 270. A web application 270 represents an application program that is stored on a remote server (e.g., a web server) and is delivered over the network 240 through the browser tab 266, for example. In some implementations, the web application 270 is a progressive web application, which can be saved on the device and used offline. The applications 218 may also include non-web applications, which may be programs that are at least partially stored (e.g., stored locally) on the computing system 202. In some examples, non-web applications may be executable by (or running on top of) the O/S 216.

The applications 218 may further include native applications 272. A native application 272 represents a software program that is developed for use on a particular platform or device. In some examples, the native application 272 is a software program that is developed for multiple platforms or devices. In some examples, the native application 272 is a software program developed for use on a mobile platform and also configured to execute on a desktop or laptop computer.

The applications 218 may further include a clipboard application, such as O/S clipboard application 104. The clipboard application 104 may be configured to store the most recent item based on a most recent capture, cut, or copy operation received during a user session 230.

The applications 218 can be configured to support copy/cut operations that allow users to copy data to a clipboard and/or store the clipboard data in memory. The clipboard data may pertain to the O/S clipboard 104. In addition, the applications 218 can be configured to copy data to a multitask UI 100 that enables several historically copied content items to be stored and retrieved. Although not shown in FIG. 2A, the computing system 202 can be configured to store content items on a multitask UI that is accessible via a network or other remote storage device.

In general, the applications 218 can be configured to support selection of text, HTML, images, objects, tables, or other selectable content item within the applications 218. The selected data can be used to generate data in fields, documents, prints, art, etc. In addition, the selected data may be used to generate search terms and/or addresses used to generate hyperlinked content, text content, or other formatted content.

Figure 3:
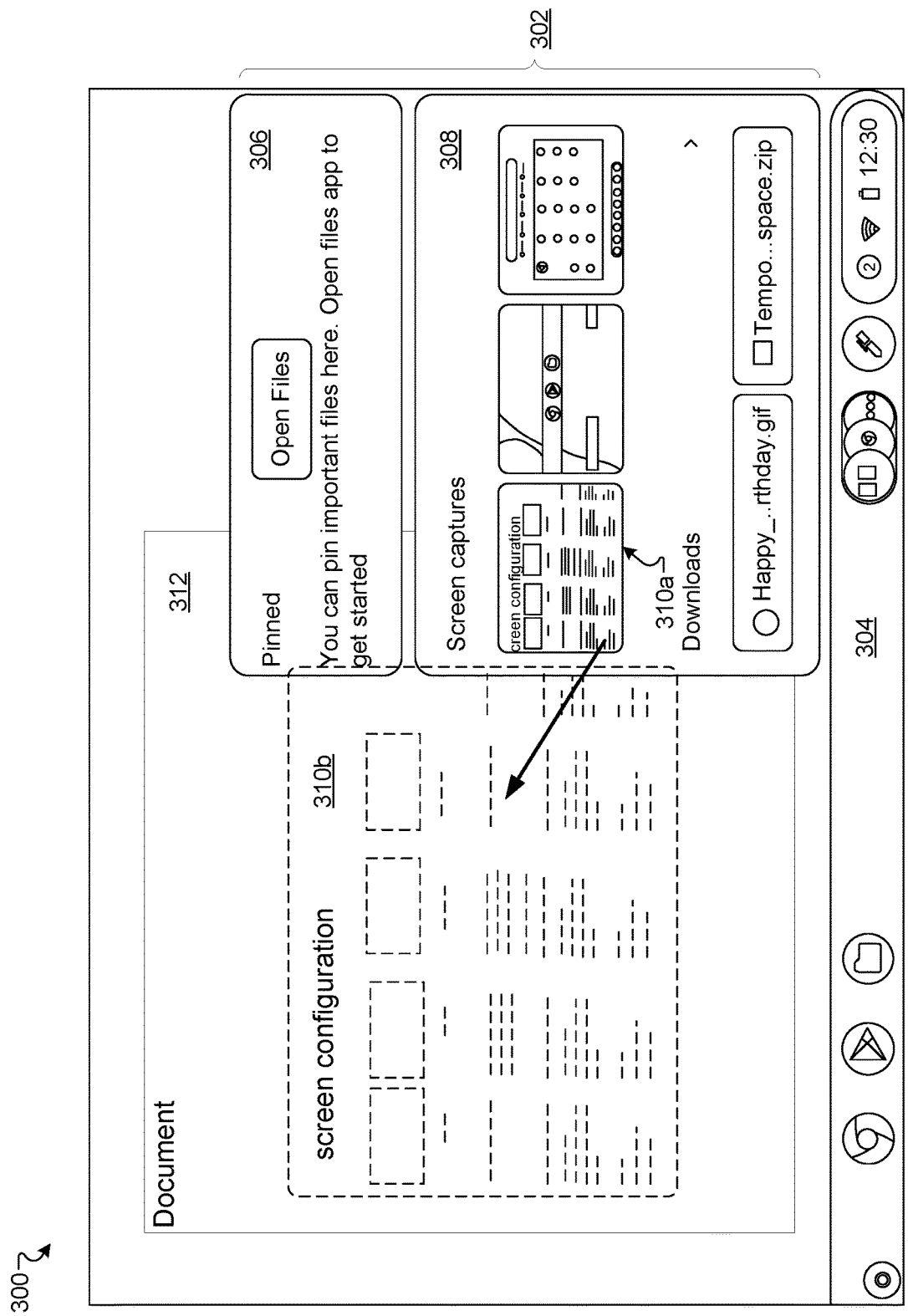
FIG. 3 is a screenshot illustrating an example multitask UI executing in a taskbar, in accordance with implementations described herein.

FIG. 3 is a screenshot 300 illustrating an example multitask UI 302 executing in a taskbar 304, in accordance with implementations described herein. Similar to UI 100, a pinned content region 306 is depicted as well as a screen captures and download content regions 308. In this example, no content has been pinned to region 306. Here, a zero state for the pinned content region 306 includes instructions to a user detailing how to begin using the region 306.

The screen captures and download content region 308 includes three screen captures and two downloads. Content items in both regions 306 and 308 may be interacted with to select and drag or copy and paste in order to place the content item in a particular document, application, field, etc. In some implementations, context menus (not shown) may be associated with the content items in regions 306 and 308. For example, if a user triggers a context menu on a particular content item, the menu may enable the user to show the item in a folder, copy the image of the content item (or the text or file), and/or unpin or delete the item.

To populate content into multitask UI 302, a user may select a particular content item from an application, document, or other source, and may enter a command to have the content item sent to the multitask UI. In response, a representation 310a of the content item may be placed in the UI 302. The representation 310a may be utilized at a later time by the user. For example, the arrow shown in FIG. 3 represents a user motion f dragging representation 310a into document 312, as shown by content item in full size as item 310b. In this example, when the user selects representation 310a and begins to drag, the UI 302 may disappear to allow the user to drag representation 310a onto any application, document, field, desktop, or other storage area available without having the UI 302 interfere with the task. In some implementations, the UI 302 is removed from view in response to detecting the select and drag operation for a content item. The UI 302 may reappear in view in the display screen in response to detecting a release of the selected content item. In some implementations, launching a file from the UI 302 may also trigger the UI 302 to be removed from view.

Figure 4:
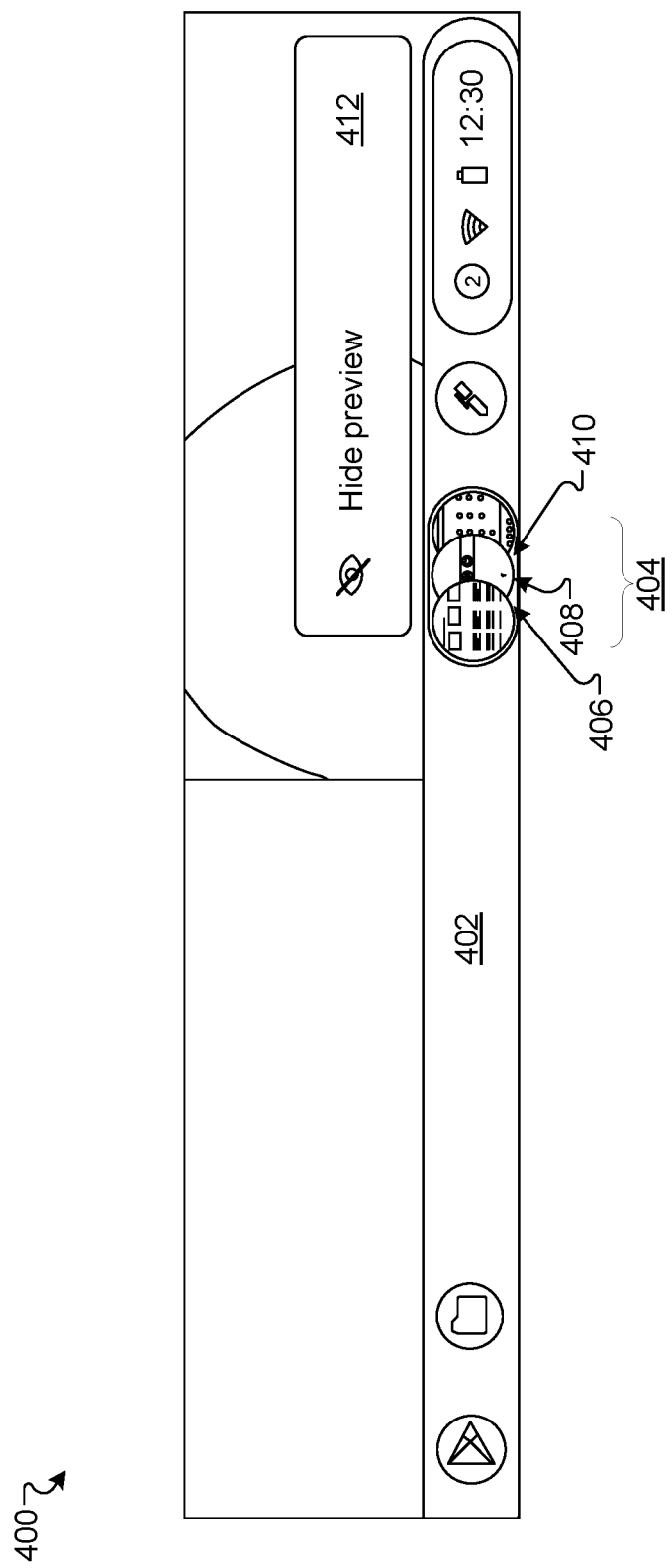
FIG. 4 is a screenshot illustrating example preview options for the multitask UI, in accordance with implementations described herein.

FIG. 4 is a screenshot 400 illustrating example preview options for the multitask UI, in accordance with implementations described herein. In this example, a taskbar 402 includes a preview region 404 based on a previous content captures carried out by a user of a computing device depicting the software pertaining to screenshot 400, for example. The preview region 404 includes a preview content item 406, a preview content item 408, and a preview content item 410.

Content items depicted in preview content items 406-408 may be selected to directly access the content. For example, if a user selects preview content item 408, the user may drag the content item associated with preview content item 408 into a document, an application, or other accessible resource capable of receiving content items. In some implementations, the user may not wish to see the preview region 404 and may select to hide the region 404 by selecting a context menu item 412.

In some implementations, captured content (e.g., files, downloads, snippets, URLs, screen captures, or other content items) can be dragged from any part of the computing system into preview region 404 to generate a preview content item (e.g., icon) within the region 404 as well as populate a content item in the UI associated with taskbar 402 and preview region 404.

In some implementations, the preview regions described herein may be animated to increase a user's ability to discover the regions. Animations can include movable, rolling, stacking, or other transition motion to depict a particular number of preview content items in the taskbar. The choreography of the animation may depend on a number of preview content items being depicted, a number content items being added to the preview content items, a number of duplicate preview content items, and/or a position of such duplicate preview content items.

Figure 5:
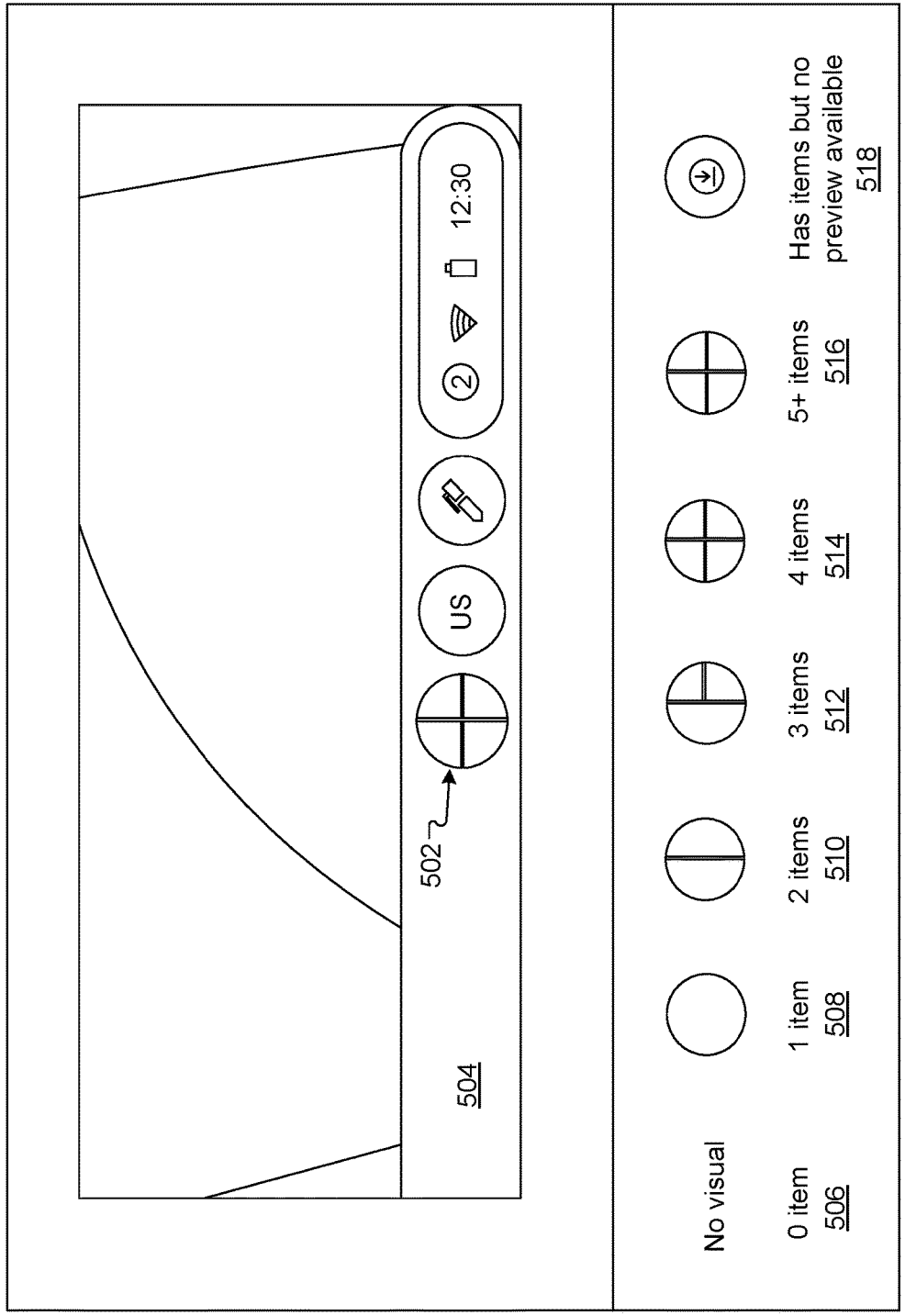
FIG. 5 is a screenshot illustrating another example of preview options for the multitask UI, in accordance with implementations described herein.

FIG. 5 is a screenshot 500 illustrating another example of preview options for the multitask UI, in accordance with implementations described herein. In this example, a preview region 502 is shown in a taskbar 504. The preview region 502 shown here is split into wedges to indicate a number of preview content items shown. Preview region 502 include four wedges indicating four preview content items are available for selection.

Other example visual indicators are available to communicate a number of preview content items available for selection. For example, no visual 506 may be depicted in the preview region 502 if zero content items are populated in the corresponding multitask UI 100. In another example, a single icon 508 may be depicted in the preview region 502 if one content item is populated in the corresponding multitask UI 100. In another example, two half icons 510 may be depicted in the preview region 502 if two content items are populated in the corresponding multitask UI 100. In another example, a half icon and two quarter icons 512 may be depicted in the preview region 502 if three content items are populated in the corresponding multitask UI 100. In another example, four quarter icons 514 may be depicted in the preview region 502 if four content items are populated in the corresponding multitask UI 100. In yet another example, four quarter icons 516 may also be depicted in the preview region 502 if more than five content items are populated in the corresponding multitask UI 100. Minimizing the number of icons depicted can ensure that a user may be able to recognize a portion of the content item from the preview. For example, if additional smaller wedges were to be generated as the content items increase in UI 100, the user may no longer be able to recognize the items from the preview region.

In some implementations, a number of content items may be populated in UI 100, but may not be depicted in a preview region. Such an example is shown by icon 518 where items are populated, but the preview has been disabled or conditions apply to not depict a preview for particular content items.

Figure 6:
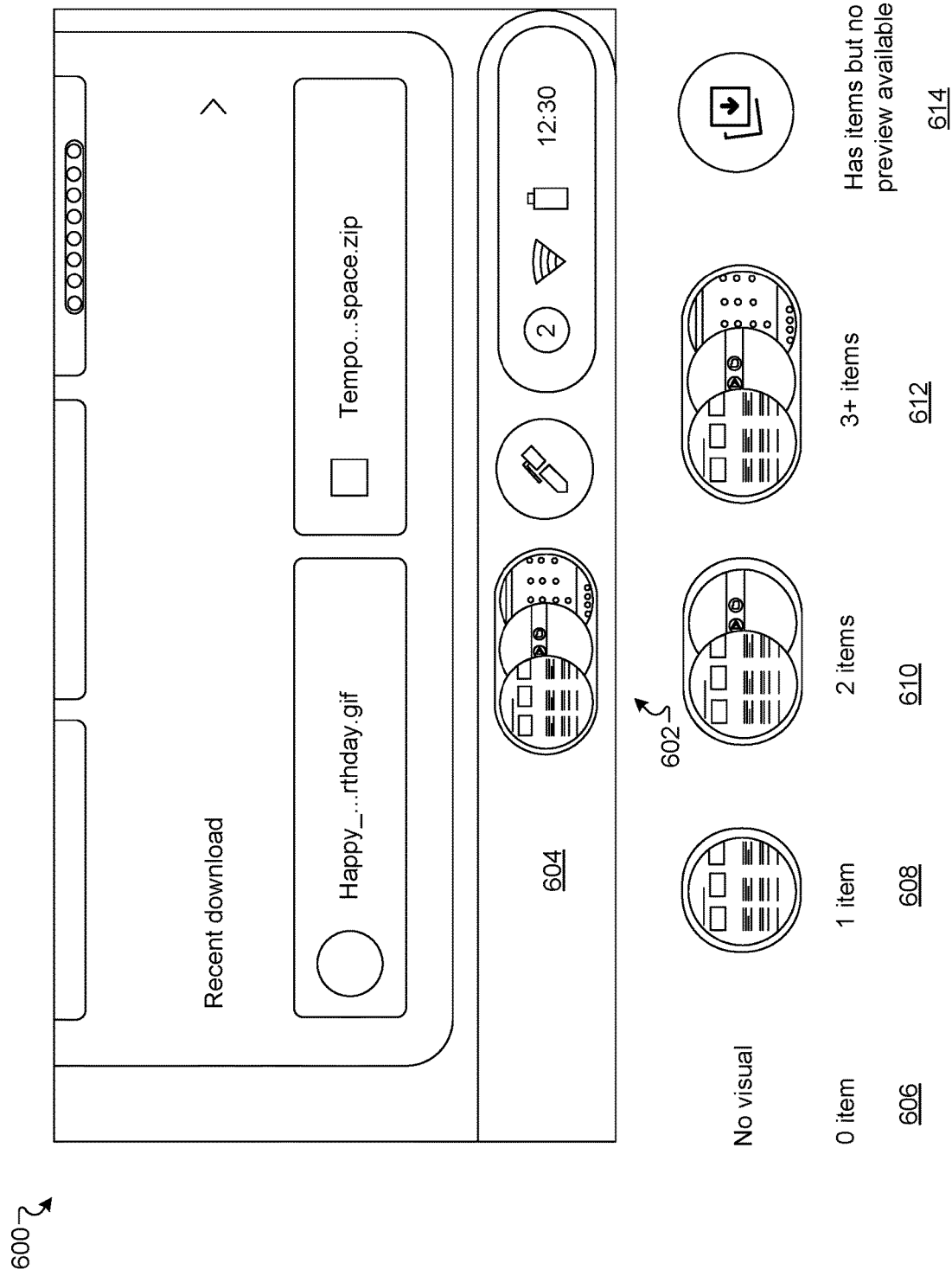
FIG. 6 is a screenshot illustrating yet another example of preview options for the multitask UI, in accordance with implementations described herein.

FIG. 6 is a screenshot illustrating yet another example of preview options for the multitask UI, in accordance with implementations described herein. In this example, full bubble icons are shown to depict previews of content items in a preview region 602 presented in a taskbar 604. The full icon provides an advantage of viewing more of the actual content item populated in the UI 100, for example.

In the full icon example, no visual 606 may be depicted in the preview region 602 if zero content items are populated in the corresponding multitask UI 100. In another example, a single icon 608 may be depicted in the preview region 602 if one content item is populated in the corresponding multitask UI 100. In another example, two full and stacked/overlapped icons 610 may be depicted in the preview region 602 if two content items are populated in the corresponding multitask UI 100. In another example, three full and stacked/overlapped icons 612 may be depicted in the preview region 602 if three or more content items are populated in the corresponding multitask UI 100. Similar to FIG. 5, if there are items populated in UI 100, but they are unavailable for preview, an icon 614 may be depicted in the taskbar 604.

Figure 7:
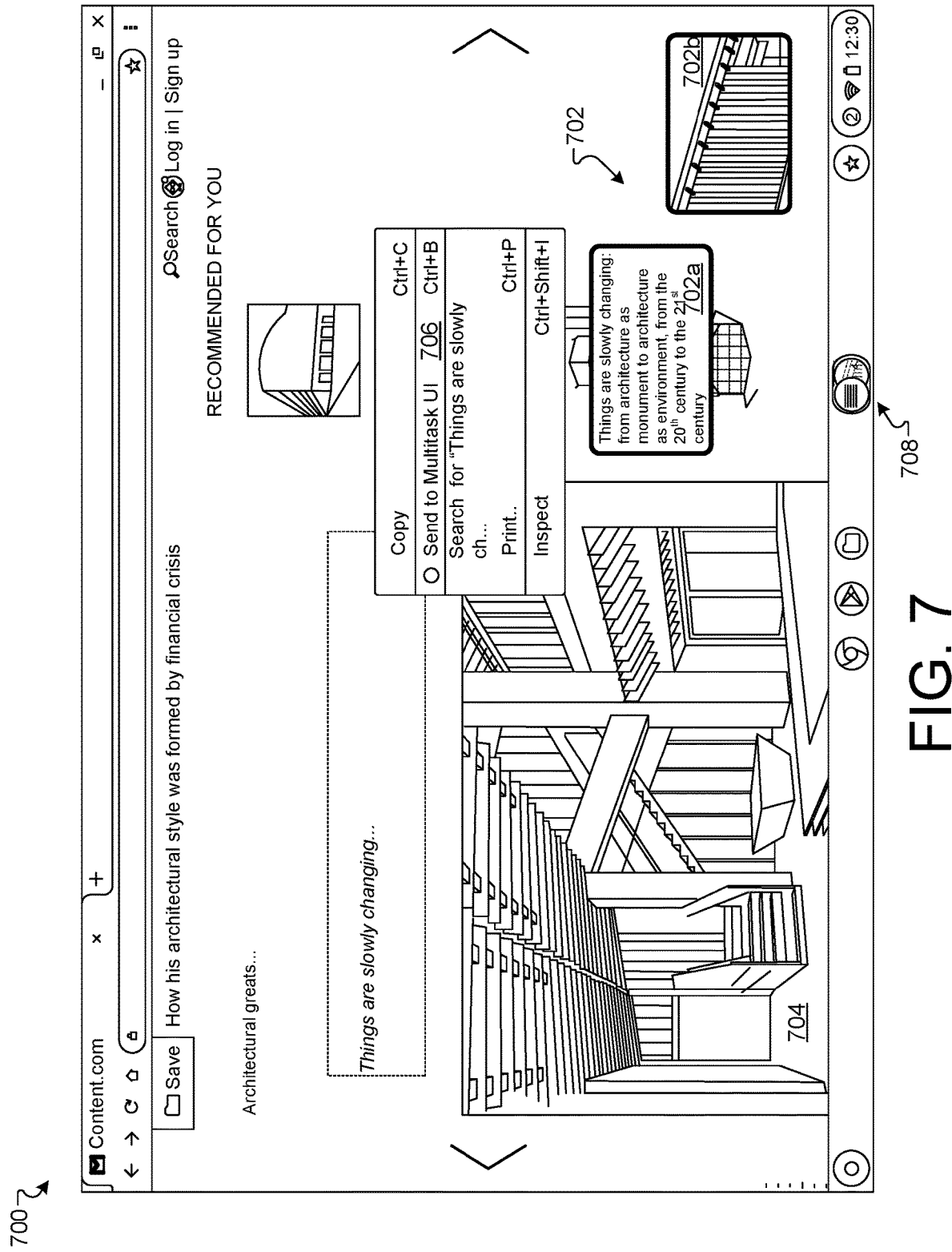
FIG. 7 is a screenshot illustrating an example of a floating multitask UI, in accordance with implementations described herein.

FIG. 7 is a screenshot 700 illustrating an example of a floating multitask UI 702, in accordance with implementations described herein. In this example, the multitask UI 702 may be split throughout a display screen. For example, a first content item 702a may represent a screen captured item while a second content item 702b may represent another screen captured item. The two items 702a and 702b may have been copied as screen captures from the browser depicted in screenshot 700 and then populated into floating multitask UI 702. For example, the user may have captured a portion of image 704 by right clicking a mouse and selecting send to multitask UI, as shown at menu item 706. This action may generate the content item 702*b* in a floating multitask UI 702 (and/or a corresponding preview item in region 708).

The floating multitask UI 702 represents a system level UI generated by an O/S to display a floating window (e.g., by generating an invisible software layer) that overlays a device screen upon receiving a user selection to float content items (e.g., images, texts, URLs, files, screen captured content, downloaded content, etc.) by dragging and dropping the desired contents, via a contextual menu (e.g. "float on top" option in the contextual menu), screenshots, or a keyboard shortcut. The floating window provides a quick reference to the content items throughout a task. In some implementations, the UI 702 allows a user to rearrange the floating content items by dragging a floating content item to a desired area of the screen. In some implementations, the UI 702 allows the user to use the floating content item as an input to another application. In some implementations, the UI 702 enables the user to resize a floating content item by zooming in/out of the floating content item. In some implementations, the UI 702 allows the user to delete the floating content items from the screen upon completing the task via the contextual menu or other shortcut. In some implementations, the UI 702 allows the user to minimize the floating content items from the screen via the contextual menu (e.g., by selecting a minimize all option).

In general, the floating multitask UI 702 may overlay all elements in a display screen until the user selects and drags one of the content items associated with UI 702. At that time, the UI 702 may remove all floating content items except the selected content item from display to facilitate drag-and-drop viewing when attempting to perform a task like copy the content item into a document.

Figure 8:
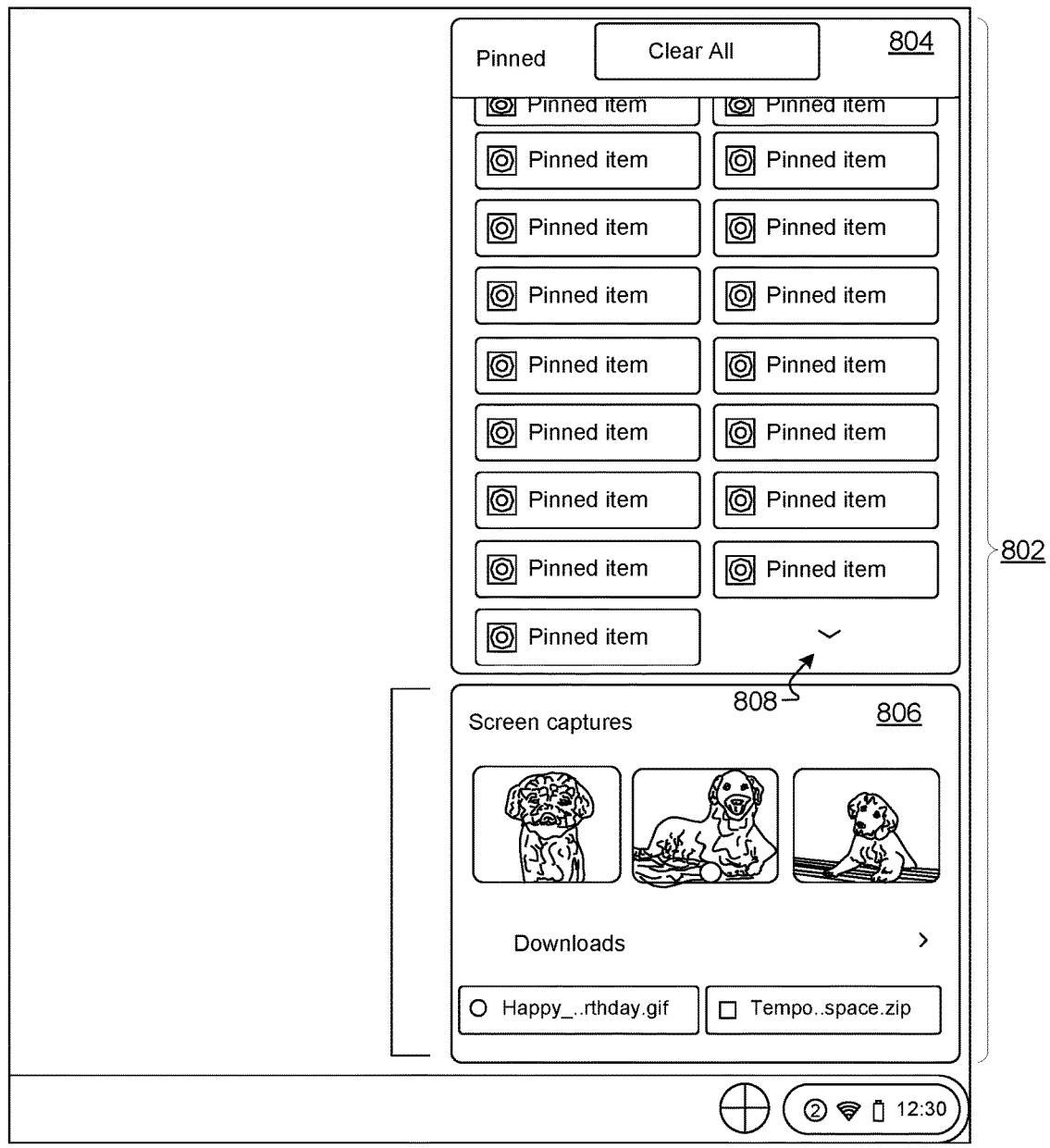
FIG. 8 is a screenshot illustrating an example of a scrollable multitask UI, in accordance with implementations described herein.

FIG. 8 is a screenshot 800 illustrating an example of a scrollable multitask UI 802, in accordance with implementations described herein. The multitask UI 802 includes a number of user-pinned content items in a pinned content item region 804 and a number of screen capture content items and downloaded content items in a screen capture and download content region 806. In the pinned content item region 804, the user may have continued adding content. In response, the system 200 may scale the container of the UI 802 near to an edge of the display screen. At this point, the user may then scroll to view any additional pinned content items using scroll control 808. The system 200 may also expand region 806 if the screen captures or downloads increase. In some implementations, the container of UI 802 may not rescale and instead may offer scroll controls in favor of retaining a smaller footprint for the UI 802.

In some implementations, the UI 802 may remove content items from view if, for example, a file path associated with a content item is changed (e.g., renamed, moved, deleted). A preview region 810 is also depicted and may be modified if or when content items are removed or added to the UI 802. In some implementations, the system 200 may persist content items in the UI 802 in response to detecting such a change in the file path. This may be configured via a setting to ensure that content is not inadvertently lost from the UI 802.

In the event that there are no screen captures populated in the UI 802, the screen captures title may be removed by system 200. If there are no downloads populated in UI 802, the downloads title may be removed. Similarly, if there are no pinned content items in region 804, the entire region may be removed.

Figure 9A:
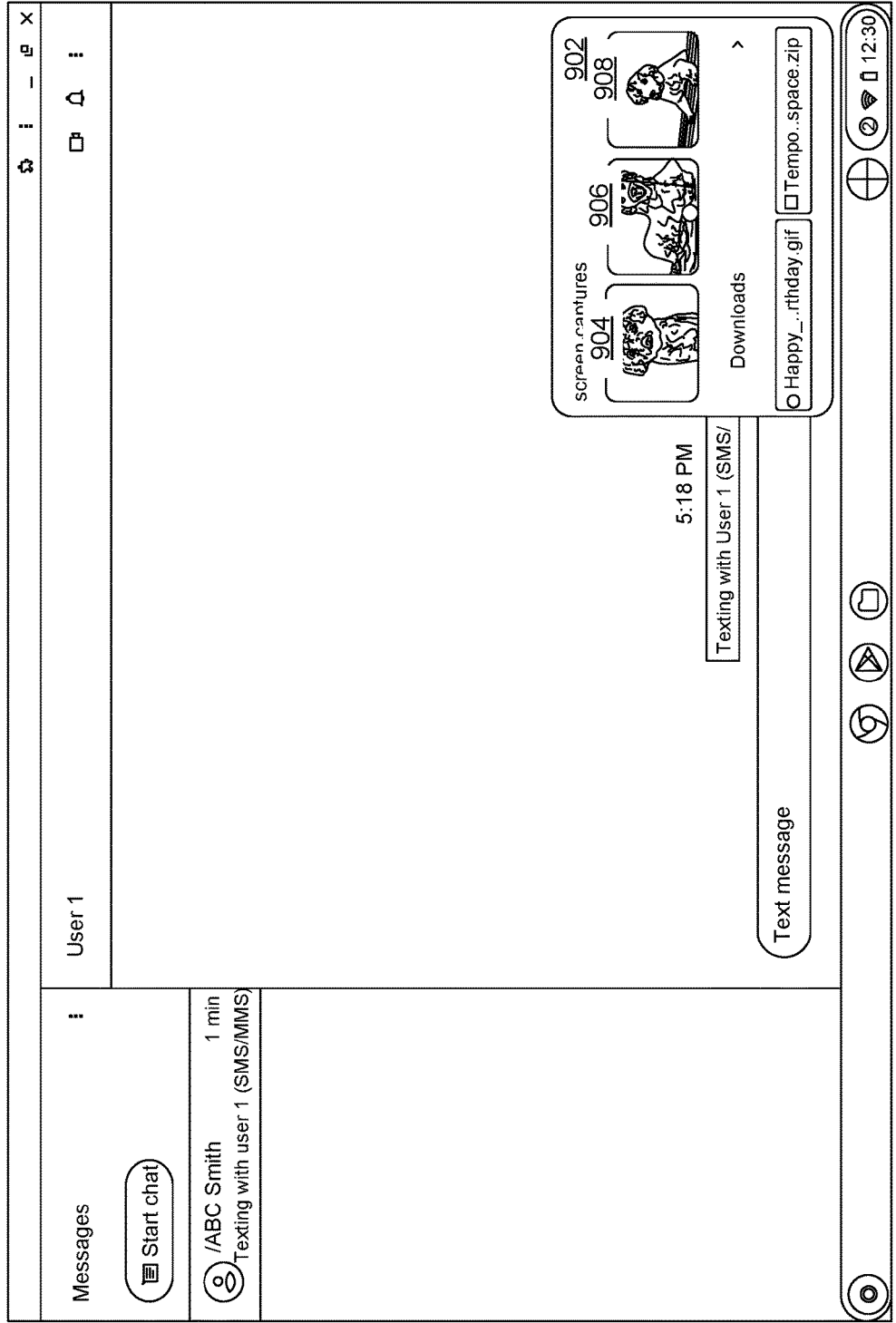
FIGS. 9A-9D are screenshots illustrating an example of using the multitask UI within an application, in accordance with implementations described herein.

FIG. 9A is a screenshot 900A illustrating an example of using the multitask UI 902 within an application, in accordance with implementations described herein. In this example, a user may be accessing a chat application to chat with user one. The multitask UI 902 here includes screen captures and downloads only since the user does not have any pinned files or content. During the chat session, the user may retrieve and paste content from multitask UI 902. For example, the user may retrieve (e.g., select and drag) recent screen captures 904, 906, or 908, downloads, or other content items from UI 902 to share with user one.

Figure 9B:
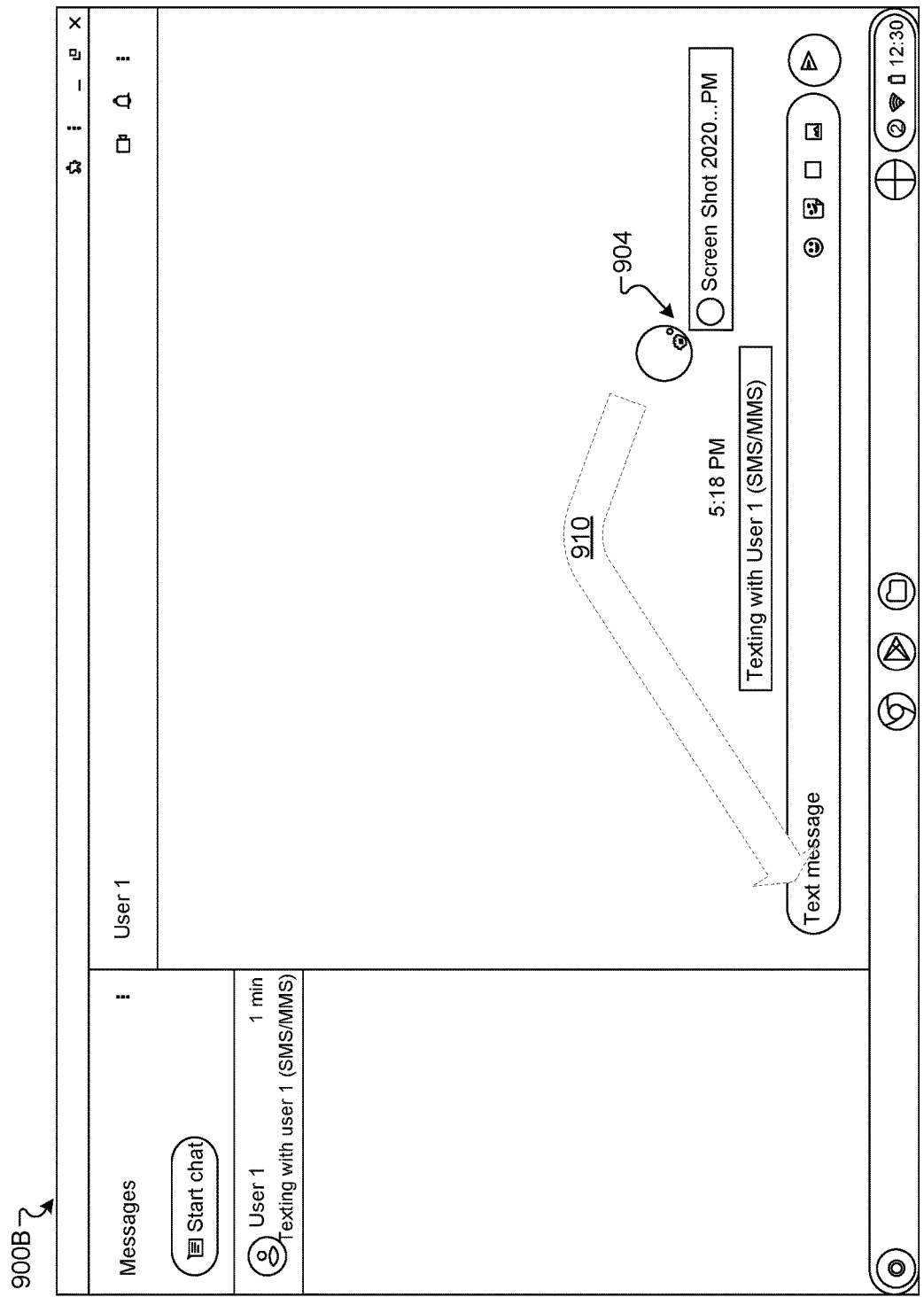

FIG. 9B is a screenshot 900B illustrating an example of dragging a content item from the multitask UI 902 into the chat application represented in screenshot 900B. For example, the user may have selected screen capture content item 904 (FIG. 9A) and begin dragging the item 904 into the chat application, as shown by arrow 910. The multitask UI 902 is removed from view while the user drags content item 904.

Figure 9C:
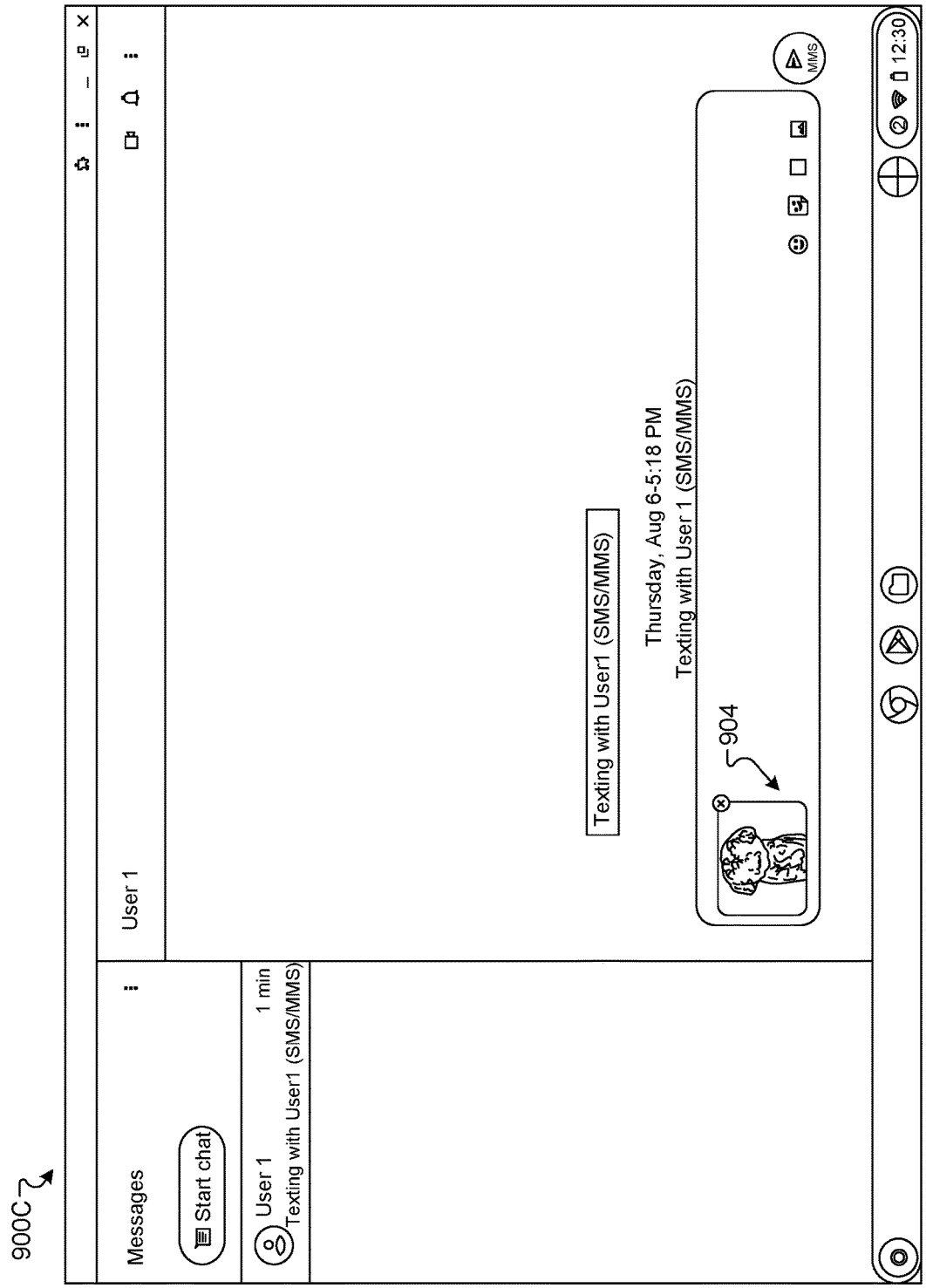

FIG. 9C is a screenshot 900C illustrating an example screen after the user has dragged and dropped content item 904 into the chat application. Here, the system 200 may insert an image file, a file path, a URL, or other data to allow content item 904 to be viewed and selected by user one when received in the chat application.

Figure 9D:
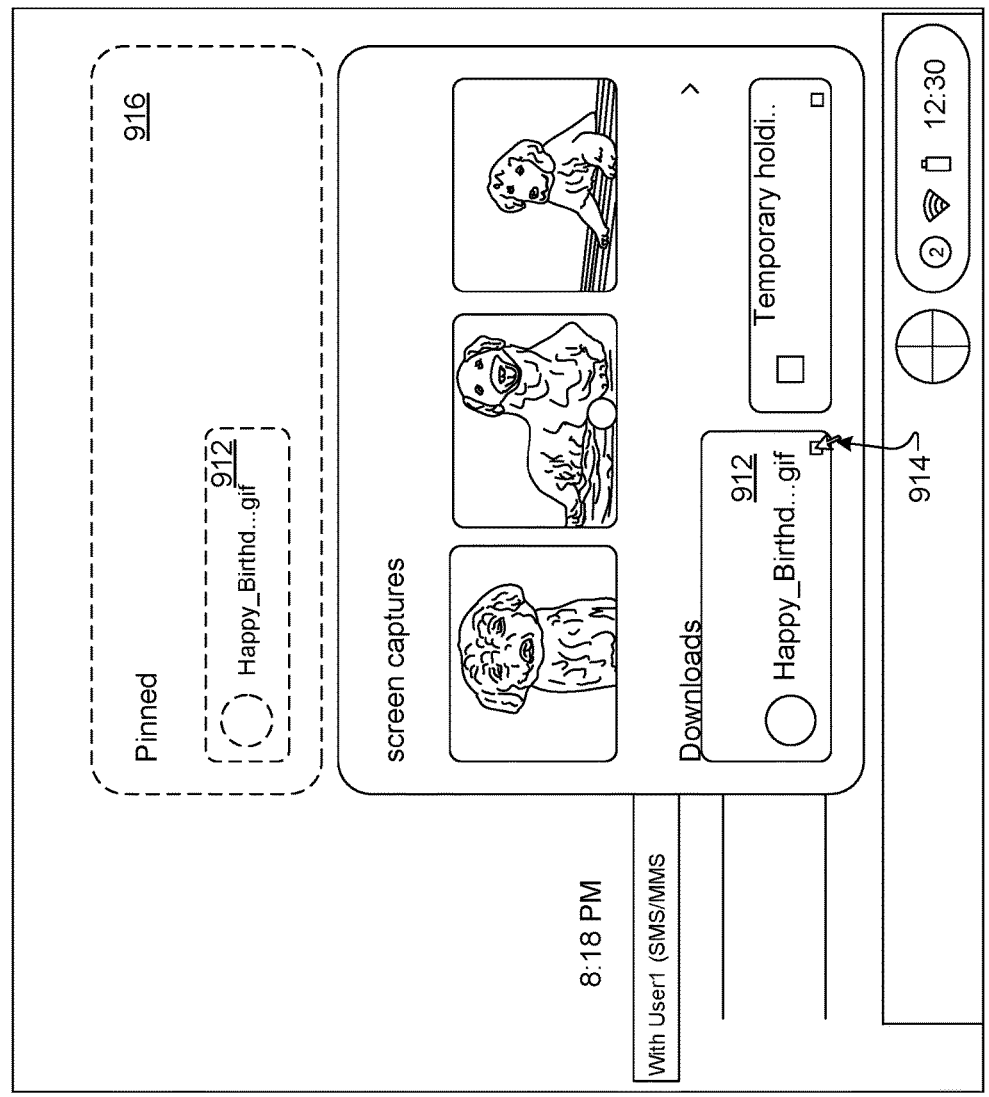

FIG. 9D is a screenshot 900D illustrating a result of pinning a content item from within the multitask UI 902. For example, a user may decide that content item 912 in the downloads region will be convenient to have available for the next few weeks. The user may then pin the content item 912 to the pinned region of multitask UI 902. For example, the user may select a control shown near cursor 914 to move the content item 912 into pinned content item region 916. In operation, the system 200 may provide such controls on all content items in the UI 902 when detecting a cursor hover over the respective content item. In some implementations, such a control may be available for each content item via a context menu. Since the UI 902 in this example did not include any earlier pinned content items, upon receiving a request to add a pinned item, the system 200 may generate another region for UI 902, as shown by region 916.

Figure 10:
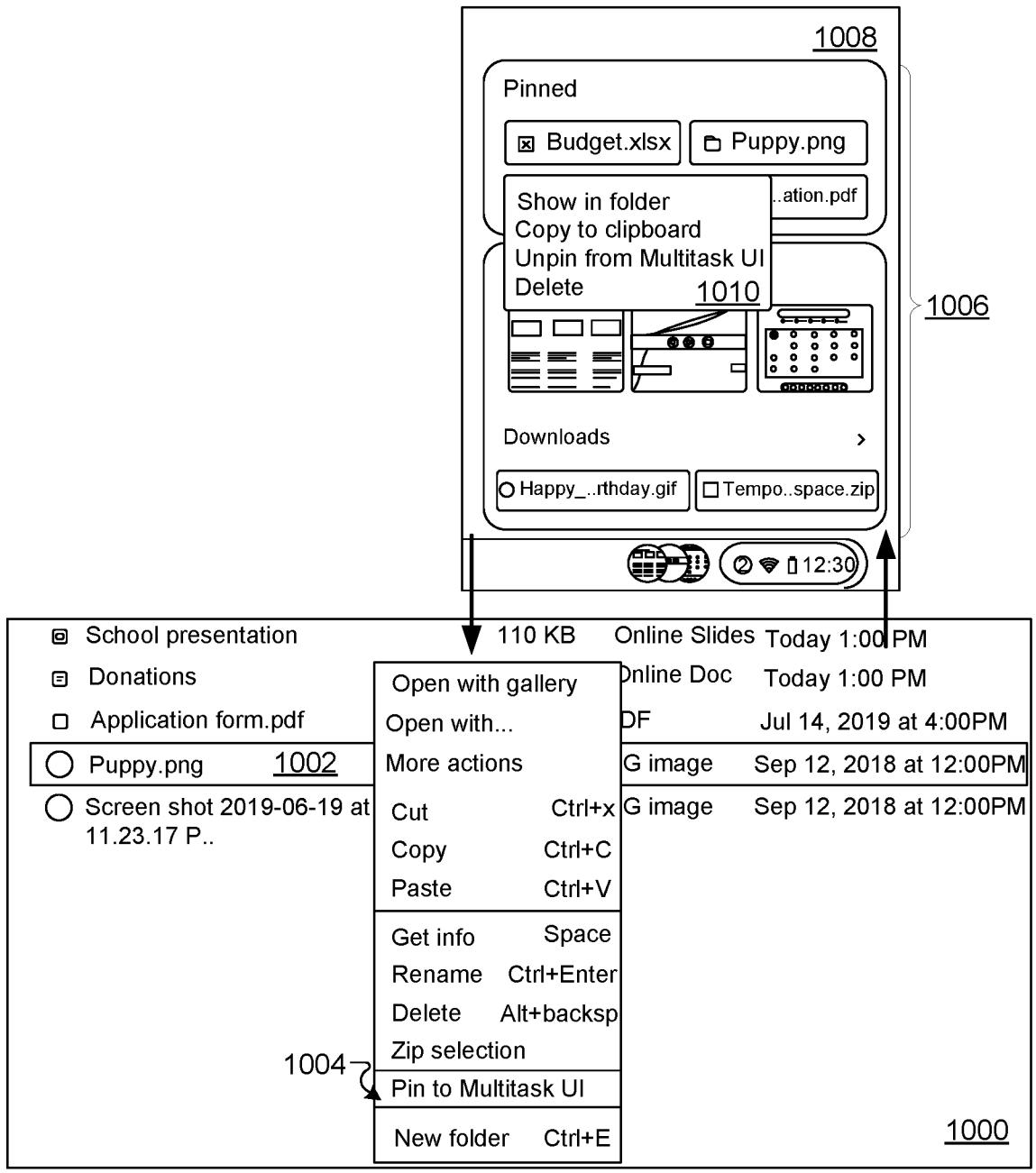
FIG. 10 is a screenshot illustrating an example of pinning content items to the multitask UI using a context menu, in accordance with implementations described herein.

FIG. 10 is a screenshot illustrating an example of pinning content items to a multitask UI using a context menu, in accordance with implementations described herein. In general, a user may pin content items from a variety of locations. For example, the user may access a file application 1000 on system 202, for example. The user may select upon a content item 1002 to trigger a context menu where an option 1004 to pin the content item to the multitask UI is selectable. The user may select option 1004 to have the content item 1002 added to a multitask UI (such as multitask UI 1006 shown in screenshot 1008).

Although the file associated with content item 1002 may be stored with file application 1000, a version or shortcut to the content item 1002 may be surfaced in the multitask UI 1006. The user may view the UI 1006 by opening the UI 1006 via shortcut or via context menu. If the user is accessing and/or viewing UI 1006, the user may access the file application 1000 (or another storage location associated with content item 1002), the user may access a context menu (e.g., context menu 1010) to select an option to view the content item 1002 in the storage location (e.g., a folder). In some implementations, the user may select an option to unpin pinned items (e.g., remove from the UI 1006 but leave items in the files associated with the UI 1006) or to delete items from the multitask UI 1006 via menu 1010.

In some implementations, the user may select other items from the context menu 1010. For example, the user may select to copy any of the pinned items, screen captures, and/or downloads to the O/S clipboard 104 for use via clipboard commands. In some implementations, the content items shown in multitask UI 1006 may be selected upon to launch the recently saved/pinned files. In some implementations, the content items shown in multitask UI 1006 may be dragged to another application.

Figure 11:
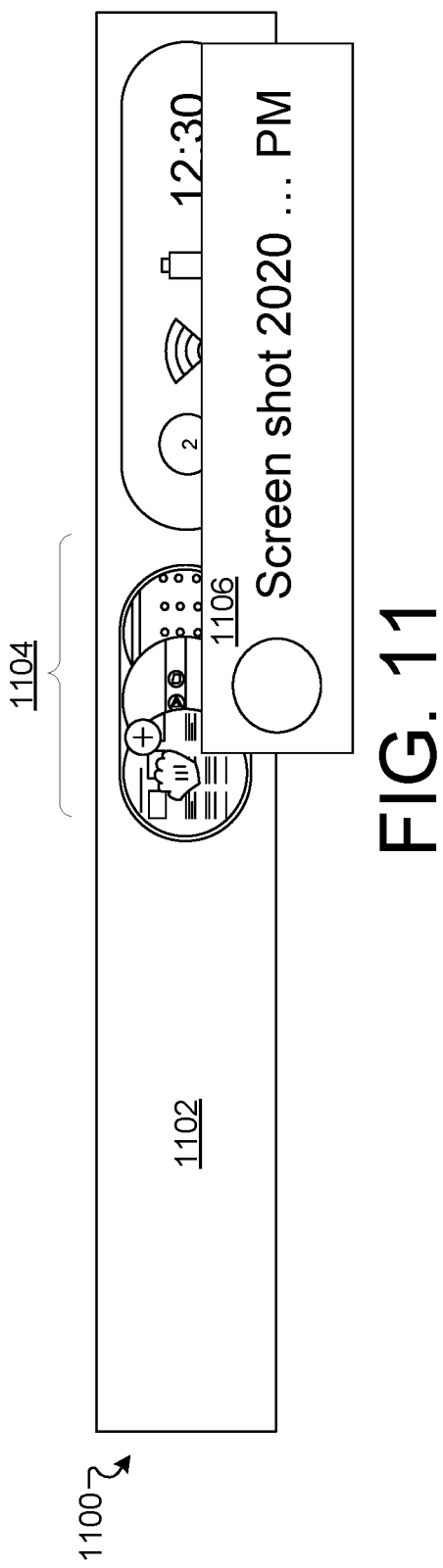
FIG. 11 is a screenshot illustrating an example of performing a drag-and-drop operation with a preview region of a multitask UI, in accordance with implementations described herein.

FIG. 11 is a screenshot 1100 illustrating an example of performing a drag-and-drop operation with a preview region of a multitask UI, in accordance with implementations described herein. For example, a user may be accessing a computing system that shows a task bar 1102 and a preview region 1104 associated with a multitask UI (not shown). The user may select a content item 1106 from a content source being accessed via the computing system 202, for example. The content item 1106 may be selected and dragged into the preview region 1104, which may trigger population of an icon in the preview region 1104 as well as population in the full multitask UI. In some implementations, a content item may not be populated in the preview region upon receiving the drag-and-drop operation, but may instead populate in the corresponding multitask UI. This may be because a particular content item type is not supported by the preview region or because the content item is marked as private information.

FIGS. 12A-12D are screenshots illustrating an example states of the multitask UI, in accordance with implementations described herein. The examples shown in FIGS. 12A-12D illustrate that the multitask UIs described herein may be rendered with any number of portions depending on user activity. Single portions may be depicted when one type of content item activity is carried out while multiple portions may be depicted and/or stacked upon other portions when multiple types of content item activity is carried out.

Figure 12B:
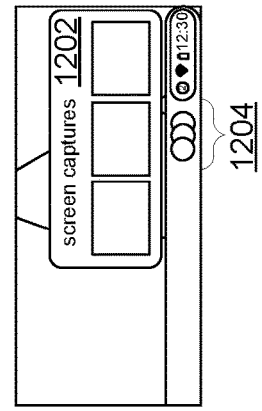
FIGS. 12A-12D are screenshots illustrating an example states of the multitask UI, in accordance with implementations described herein.
Figure 12D:
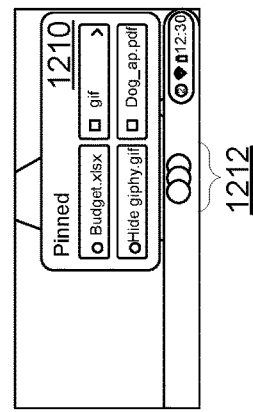
Figure 12A:
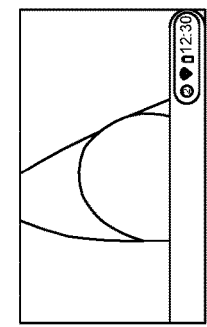

FIG. 12A depicts a screenshot 1200A in which a user has not taken any screen captures or downloads in the past one day time period. Thus, a multitask UI that is associated with the user session (e.g., corresponding to computing system 202), is not shown. In some implementations, the time period may be predefined to be longer than one day or may be as short as one session. In addition, no preview region is shown because the multitask UI is determined to be empty by an O/S associated with computing system 202.

FIG. 12B depicts a screenshot 1200B in which a user has performed three screen captures in the past predefined time period. The three screen captures are shown in a multitask UI 1202 as well as a preview region 1204. Because the user has not performed any recent download of content items nor pinned any files/content items, no such content is shown in UI 1202.

Figure 12C:
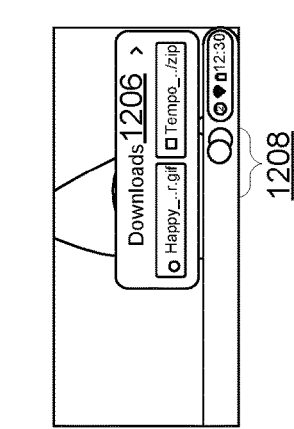

FIG. 12C depicts a screenshot 1200C in which a user has performed two downloads in the past predefined time period. The two downloads are shown in a multitask UI 1206 as well as a preview region 1208. Because the user has not performed any recent screen captures nor pinned any files/content items, no such content is shown in UI 1206.

FIG. 12D depicts a screenshot 1200D in which a user has pinned content items in the past predefined time period. The pinned content items are shown in a multitask UI 1210 as well as a preview region 1212. Because the user has not performed any recent screen captures nor downloaded any files/content items, no such content is shown in UI 1210.

Figure 13:
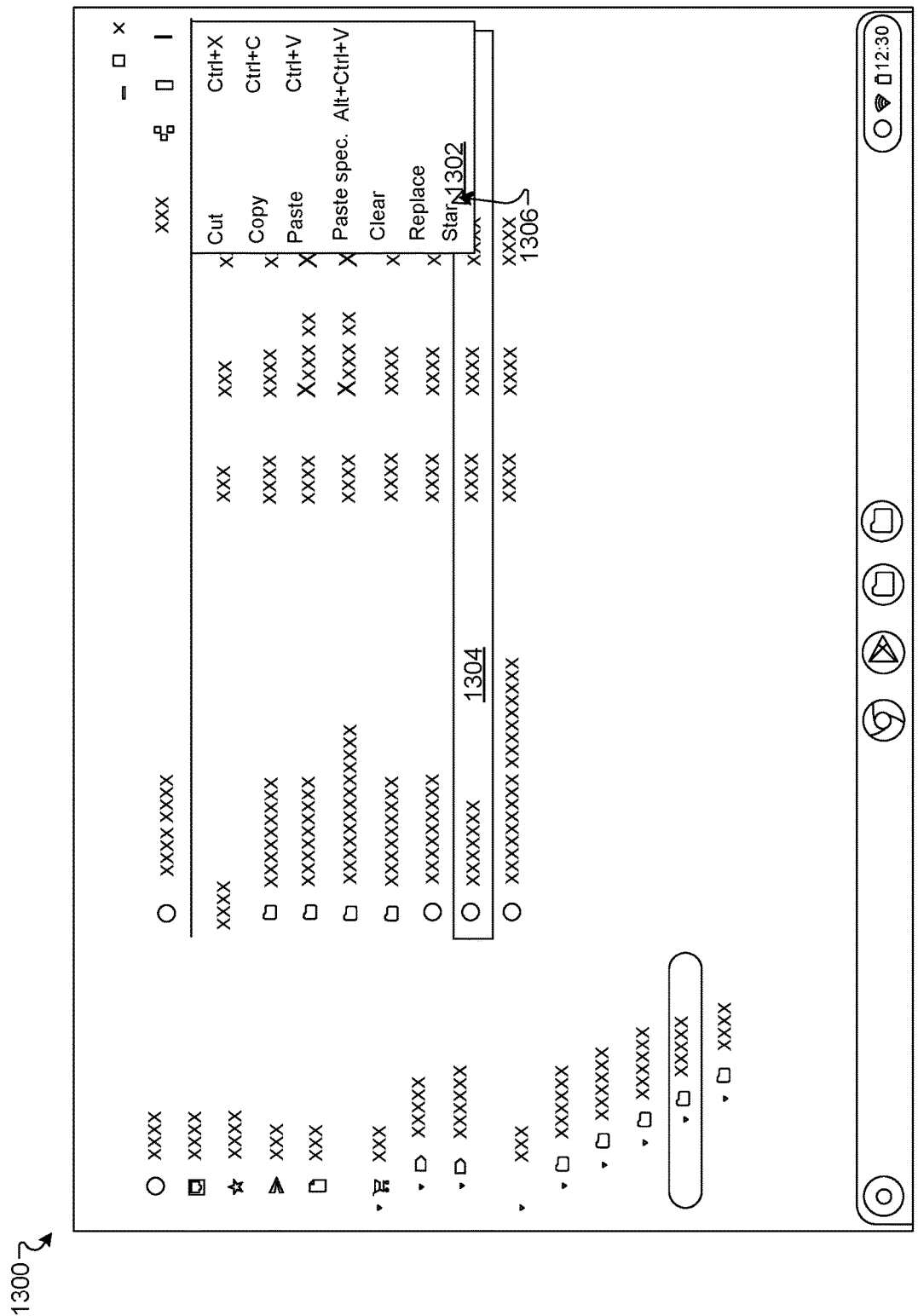
FIG. 13 is a screenshot illustrating an example of populating a multitask UI from a file system, in accordance with implementations described herein.

FIG. 13 is a screenshot 1300 illustrating an example of populating a multitask UI from a file system, in accordance with implementations described herein. In this example, a user may be accessing a recent downloads file folder, a recent screenshot file folder, for example, to populate a multitask UI for a project. The user may perform such a task in this way based on having performed research for a project at a prior time where the research included downloads and screenshots. The user may have remembered performing the research and capturing the content items, but a time period for storing such items automatically in the multitask UI may have expired. Thus, the user may manually access the files to quickly populate the multitask UI. For example, a user may access the file application shown in screenshot 1300 and may review the content items for the project. As the user reviews the file names and download dates, etc., the user may select to receive a context menu for each item. The context menu may include an option 1302 to star an item. In response to receiving a selection to star a content item 1304, shown by cursor 1306, the system 200 may star the selected content item and place the content item 1304 in the multitask UI (not shown). Any number of content items may be starred to trigger population in a multitask UI associated with the user and/or user session. The user may then carry out the project with the newly populated multitask UI.

In some implementations, downloaded or previously accessed web content may also include an option to star the content at a later time for upload to the multitask UI. In some implementations, entire folder contents may be pinned to the multitask UI to easily access previously downloaded or screen captured content.

Figure 14A:
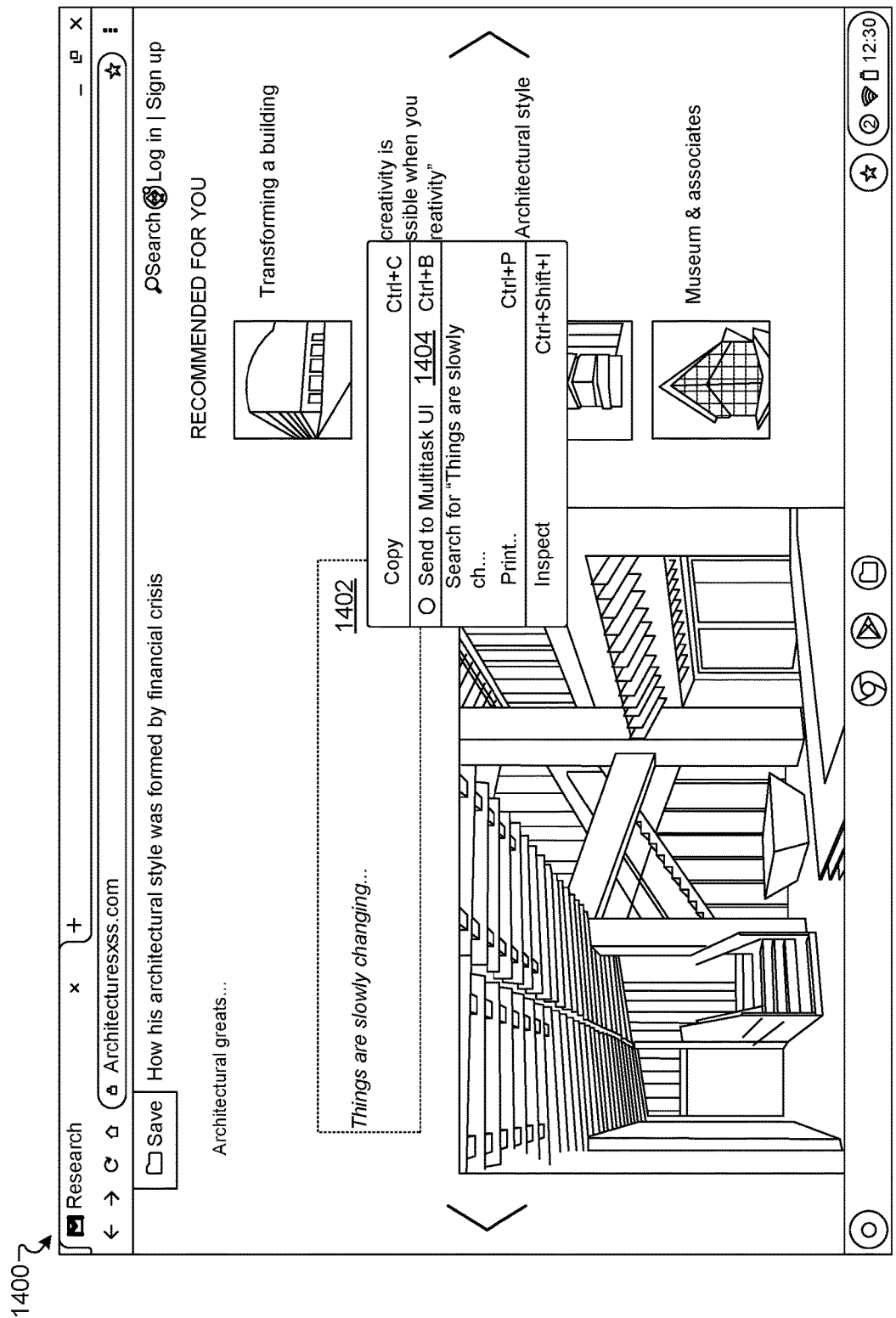
FIGS. 14A-14C are screenshots illustrating an example of accessing and populating the multitask UI within an online application, in accordance with implementations described herein.
Figure 14B:
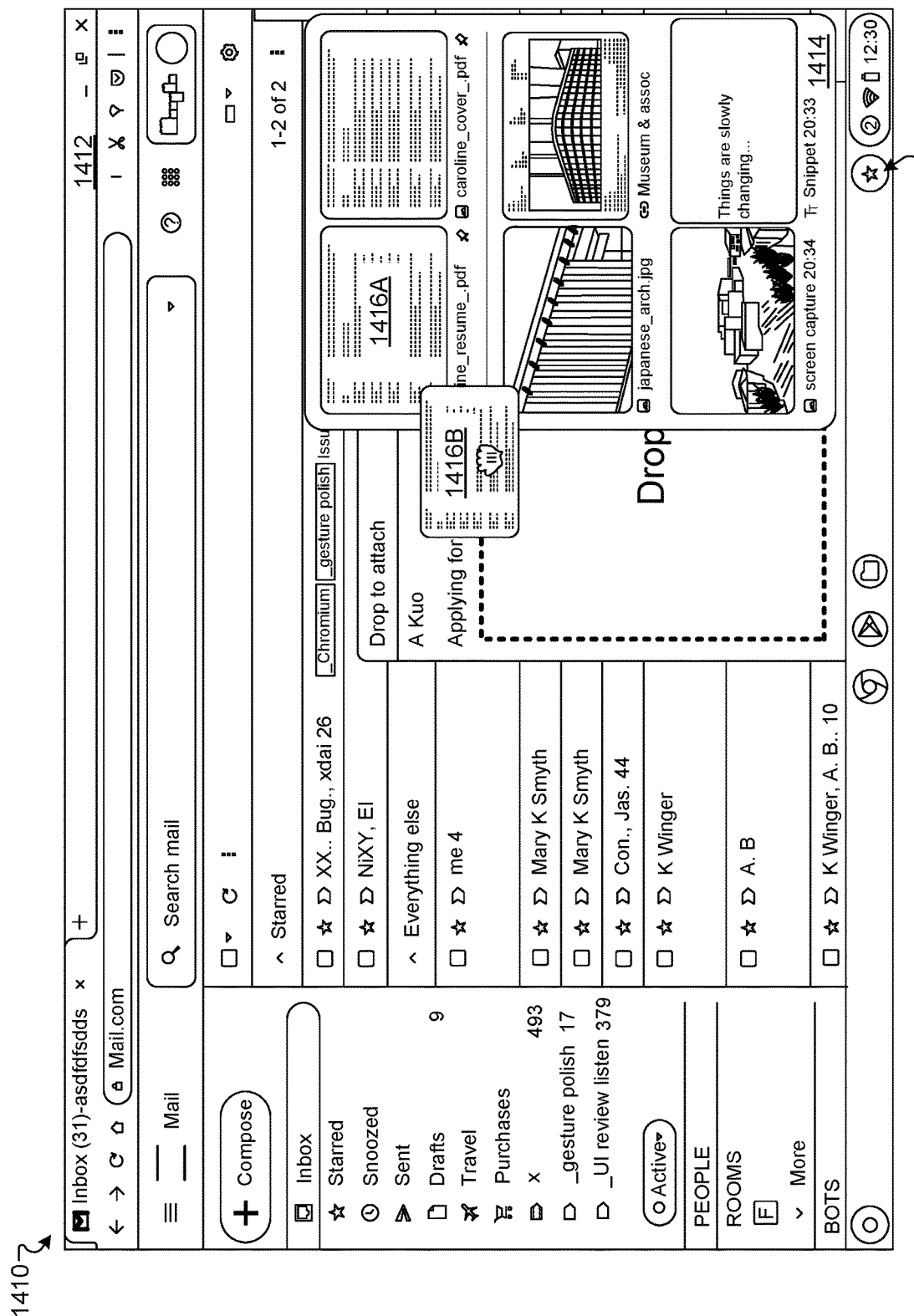
Figure 14C:
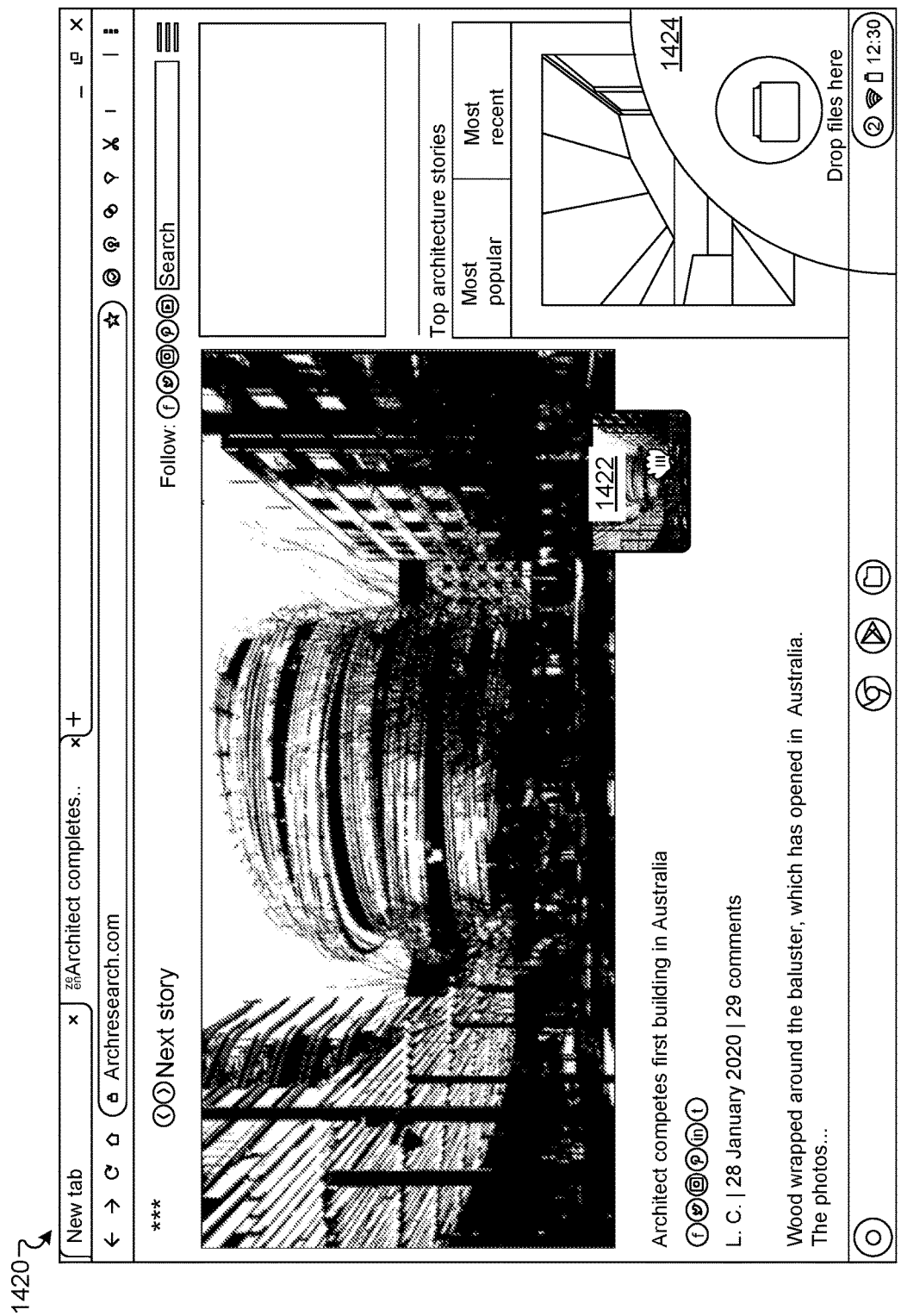

FIGS. 14A-14C are screenshots illustrating an example of accessing and populating the multitask UI within an online application, in accordance with implementations described herein. In general, the examples shown in FIGS. 14A-14C include at least two modes to save content items for quick access. A first mode may include a copy/paste history for a last predetermined number of saved content items over a predefined time period. The second mode may include an explicit storage mode via drag-and-drop operations, pasting and sending highlighted content to storage space via keyboard shortcut or context menu.

FIG. 14A is a screenshot 1400 depicting an online web page in which a user is viewing content and saving the content to a multitask UI. In particular, the user may be carrying out research about architecture content for a presentation. The user may access images, quotes, etc. and begin to store content on a multitask UI. In this example, the user selects a quote 1402 and accesses a context menu to select an option 1404 to send the quote to the multitask UI.

In operation, the system 200 may maintain and populate the multitask UI by observing clipboard contents and maintaining an external record via content items 208, for example, which is not associated with the O/S clipboard (e.g., O/S clipboard 104). The system 200 may modify the O/S clipboard interface to allow reading the clipboard history and may modify the implementation of the O/S clipboard.

FIG. 14B is a screenshot 1410 depicting a user accessing an email application 1412 and a multitask UI 1414. In this example, the user selects content item 1416A and begins to drag a copy of the content item 1416A, as shown by copy content item 1416B. The user may drag the content into the email application to send content to other users. In this example, the multitask UI 1414 includes content items that were previously indicated as star items, as indicated by star 1418. Therefore, when the user accesses UI 1414, the user may access it from the star icon 1418 to bring up the starred content items which were previously downloaded, screen captured, and/or pinned, as well as marked as pertinent to the user.

FIG. 14C is a screenshot 1420 depicting an online web page in which a user is viewing content and saving the content to a multitask UI. In this example, the user selects an image 1422 and in response, the system 200 may generate and render an indicator 1424 to direct the user where to store content items. The indicator 1424 may be generated from a yet to be used multitask UI. Dragging the image 1422 and dropping the image onto indicator 1424 may populate the image 1422 in the multitask UI (not shown)

Figure 15:
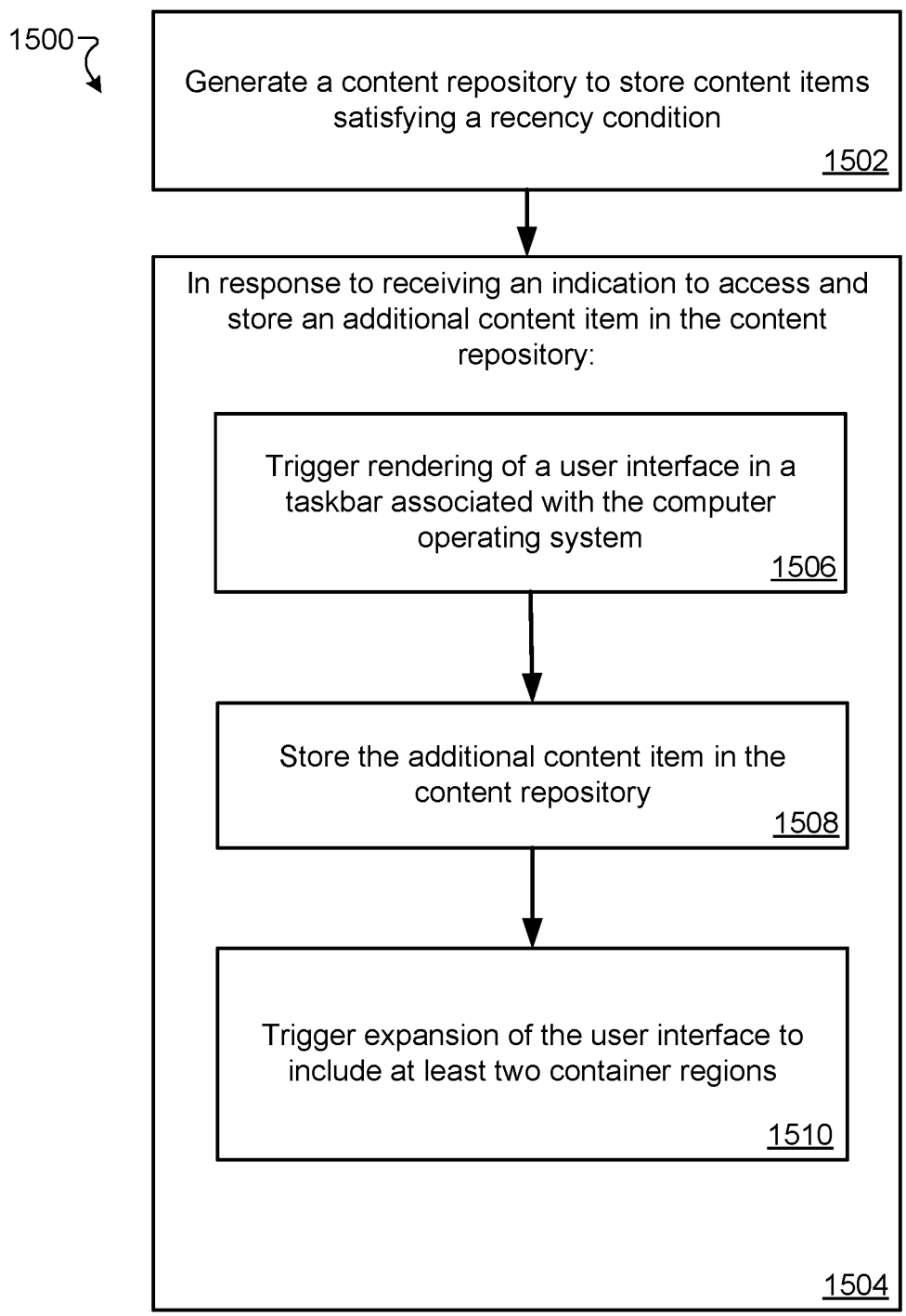
FIG. 15 is a flowchart of an example process for generating and populating a multitask user interface, in accordance with implementations described herein.

FIG. 15 is a flowchart of an example process 1500 for generating and populating a multitask user interface, in accordance with implementations described herein. In general, process 1500 utilizes the systems and algorithms described herein to generate and render content items in a multitask UI 100. The process 1500 may utilize one or more computing systems with at least one processing device and memory storing instructions that when executed cause the processing device(s) to perform the plurality of operations and computer implemented steps described in the claims. In general, UI 100, system 200, and/or system 1600 may be used in the description and execution of process 1500.

At block 1502, the process 1500 includes generating a content repository to store content items satisfying a recency condition. The recency condition may pertain to a predetermined amount of time set by the system 200, a user of system 200, or another rule or setting associated with the system 200. For example, satisfying the recency condition may include detecting that a respective content item in the content items is detected to be stored within a predefined threshold time period. Detecting when a content item was previously stored may include detecting a timestamp associated with storing the respective content item and determining that the time stamp is within the predefined threshold time period. Such a period may include one user session up to and including one year. In some implementations, the predefined threshold tine period for the recency condition is configurable. For example, a user may configure the time period for the recency condition. Similarly, the system 202 may automatically configure the predefined time threshold and the recency condition, for example, based on a frequency of use of content items and/or a determined volume (or rate) of content items being added over a period of time.

In some implementations, the predefined settings include a first setting associated with a first region (e.g., a pinned region) of the at least two regions in which the first setting enables access to the additional content item and a clipboard associated with the computer O/S to retrieve and render a portion of content items associated with the clipboard. In some implementations, the predefined settings include a second setting associated with a second region (e.g., downloads, screen captures, etc.) of the at least two regions in which the second setting enables access to the content repository to retrieve and render the content items satisfying the recency condition (i.e., recent downloads, recent screen captures, and the like).

In some implementations, the first region depicts the additional content items in response to detecting that the additional content item is requested to be pinned to the UI 100. In some implementations, the second region depicts the additional content item, in response to detecting that the additional content items includes a recent screen capture or a recent data download.

The content repository that stores the content items may be modifiable by a computer operating system (e.g., O/S 216), but may be restricted to reading operations by applications executing in the computer O/S 216. For example, rather than allow applications and web pages access to changing the repository, the system 200 may enable the applications and web pages to request to store content via the multitask UI 100. Restricting direct modification access to the repository may ensure that users may access the content stored, but may not modify an originally stored file, etc. In some implementations, the files stored for provision in UI 100 may be copies themselves of the originally stored files. Enabling O/S access to such files allows system 200 to utilize O/S and browser commands to interact with such content. For example, a keyboard shortcut to copy and/or paste content items can be used with the O/S clipboard 104 as well as with UI 100 because the O/S 216 provides access to the shortcut via both interfaces 104 and 100.

At block 1504, the process 1500 includes detecting whether an indication to store an additional content item in the content repository is received. For example, the system 200 may determine whether a user is attempting to download content items, take a screen capture of a content item, or pin a content item. In response, the system may determine that the user wishes to access multitask UI 100 to store such content.

At block 1506, the process 1500 may include triggering rendering of a user interface in a taskbar associated with a computer O/S. For example, in response to receiving an indication to access and store additional content items in the content repository, the system 200 may trigger rendering of a user interface (e.g., preview region 130) in a taskbar 101 associated with the computer O/S. The indication may include a copy or cut command, a file selection command, a triggered data download, a selected data download, a drag-and-drop command, a context menu selection, a screen capture (e.g., image and/or video), or other configured shortcut to obtain content and move the content to another location.

The user interface may depict at least a representation of the additional content items. For example, the system 200 (via preview manager 220) may generate a preview region, such as region 404 that includes one or more of the content items indicated to be stored. A representations in the preview region may be a miniaturized version of a content item. In some implementations, the representation may include portions of data in the content item. For example, responsive to receiving additional indications to store different content items, the system 200 may generate and depict, for each indication, an additional representation of the respective different content items, for example, in the preview region. Each additional representation may be generated to overlay a portion of at least one of a previously rendered representations to provide stacked UI elements that are selectable, moveable, animatable, and the like.

At block 1508, the process 1500 includes storing the additional content item in the content repository. For example, the additional content item may be obtained and stored by the O/S 216 to enable rendering and selection of the stored additional content item from the multitask UI 100.

At block 1510, the process 1500 includes triggering expansion of the user interface to include at least two regions. For example, in addition to depicting at least a portion of the additional content item in the preview region, the system 200 may expand portions of the UI 100 to include a screen capture region for recent screen captures. Similarly, the system 200 may expand potions of the UI 100 to include a download region for recent downloaded content items. In addition, the system 200 may expand portions of the UI 100 to include a pinned content item region to render pinned content items in the UI 100. In general, the at least two regions include a rendering of a representation (e.g., thumbnails, images, portions of content items, links, text, etc.) of the content items satisfying the recency condition and a representation (e.g., thumbnails, images, portions of content items, links, text, etc.) of the additional content item. In some implementations, the recency condition applies to a portion of the regions while not pertaining to other regions in the UI 100. For example, pinned content may not have a recency condition if the user has not configured a time period associated with retaining pinned items in the UI 100.

In some implementations, the multitask UI 100 is rendered and maintained as viewable while accessing one or more applications executing in the computer O/S. This may provide an advantage of being able to access all project files stored in the UI 100 without minimizing or moving windows and application content. In some implementations, the UI 100 is removed from view, in response to detecting a select and drag operation for at least one content item. This may allow the user to access the content and drag it, but then minimize or remove the UI 100 to view any content that the UI 100 may have obfuscated when displayed. In such an example, the UI 100 may reappear in view, in response to detecting a release of the at least one content item. For example, when the user drags and then drops the item, the system 200 may deduce that the drag-and-drop transaction is complete and that the user may wish to select additional content from UI 100. In some implementations, the UI 100 reappears in view as an overlay to all items displayed in the display screen of the computing system rendering the UI 100.

In some implementations, the content items satisfying the recency condition and the additional content item are configured to be selectable from the user interface to be provided as input into a document, an online document, or an application. In some implementations, the received indication to access and store additional content item in the content repository includes a selection from a context menu of at least one of the applications executing in the computer O/S. The context menu may be modified by system 200 via the O/S based on the indication in order to provide an option to select to store the additional content item in the content repository.

In some implementations, content items may be removed from the multitask UI 100. For example, content items and the additional content item may be removed from the UI 100 upon detecting expiration of a predefined time threshold and an indication to end a user session with the computer operating system. This may ensure that a user does not lose content items in the middle of a session. The system 200 ensures that the predefined time threshold has been met and that the user has ended a session. In some implementations, content items and the associated rendered images in the UI 100 may be removed from the UI 100 upon detecting a change in a file path associated with the particular rendered content item. For example, if the user removed files from a particular file folder, the system 200 may automatically clean out the UI 100 to remove the files that no longer link back to an original location in which the content item was obtained for UI 100.

In some implementations, rendering content items in the multitask UI 100 may include rendering a representation of each of multiple sets of content items according to the content type determined for each content item in the multiple sets of content items. For example, the system 202 may determine that a particular set of content items represent images while other sets of content items represent any or all of URLs, online documents, text content, file content, and the like. The system 202 may then render such different sets of content items in order to group the items by type. Within the grouped image sets, the particular content items (e.g., the representations of the content items) may be ordered according to system or user-provided rules. For example, the system may automatically group content items of the same type and order the items according to the date of capture (or UI population) of the content item. In some implementations, the system 202 may order content according to automated rules associated with the UI 100. In some implementations, the system 202 may provide automated recommendations for how to order the content items and/or automated recommendations for how to group the content items. In some implementations, a user may customize the grouping and/or ordering aspects of the content item rendering in order to accommodate user preferences and easy access to the content items. In general, the grouping may be determined by content manager 214, UI generator 206, and/or policies and permissions 254.

In some implementations, the UI 100 may be rendered in response to detecting another suitable trigger (such as a user selection of an input field, in response to detecting a user input selecting the UI 100, etc.). In some examples, the representation of the content item may be generated in advance and stored until rendering of the multitask UI 100 is triggered; this can reduce lag time in rendering the UI 100 when the rendering is triggered.

In some implementations, the rendering of the UI 100 may be triggered based on receiving an input from the user requesting to view the UI 100. For example, a menu selection of the UI 100, a keyboard shortcut to access the UI 100, or an inputted paste operation may trigger rendering the UI 100.

The content items may be grouped together (e.g., rendered together) in the UI 100 according to a corresponding copy operation or cut operation. For example, the content item and the other content items may be grouped according to a time of capture ensuring that all content items are uploaded and populated sequentially in the UI 100. In some implementations, the temporal proximity associated with content items may be used as a basis in which to group and/or otherwise render content items within UI 100. For example, the content item and the additional content item may be rendered in the user interface according to a temporal proximity of a copy operation or a cut operation associated with capturing the content item or the additional content item.

In some implementations, any combination of grouping criteria can be used to group content items. For example, content items may be grouped according to content type, temporal proximity of the copy/cut operation, according to a day, week, month, year of capture, according to file type, author, application association, or any combination of the above.

In some implementations, the content items may be rendered in groups in the UI 100 according to content type. For example, each item type (text, image, file, table, online document, links, etc.) may be grouped together with other content items of the same type. For example, image content items may be grouped and presented together in a first area of UI 100 while text content items may be grouped together in a second area of UI 100.

In some implementations, the content items may be rendered in groups in the UI 100 according to a semantic understanding of the content items. For example, computing system 202 may determine contexts with respect to user access and use of particular content items. This context may be used as a basis in which to group and render content items in the UI 100. For example, the system 202 may determine and interpret which content items are often used (or recently used) in order to curate the UI 100 with the often used (or recently used) content items rendered in a conveniently selectable location in the UI 100.

In some implementations, the content items may be rendered in groups according to multiple rules and/or contexts. For example, the system 202 may be configured to render content items according to population time or sequence, content type, context, user-generated rules, semantic understanding of content items, and/or any combination thereof. User-generated rules may be used to determine an order of preference for how to group content items.

In some implementations, the content item and the other content items (e.g., sets of content items) are grouped in the multitask UI 100 according to a temporal proximity of the copy operation or the cut operation and/or a time period associated with capture of the content item or the other content items. In some implementations, the content item and the other content items are grouped in the UI 100 according to a detected object represented in the content item or the other content items. For example, a number of content items may both include similar images. The system 202 may determine that the content items with similar images may be grouped together since they include similar content.

In a similar fashion, the system 202 may determine other context or content similarities and may trigger grouping of content items based on such context or similarities in order to render such content according to the determined grouping.In some implementations, the process 1500 may remove content items associated with the UI 100, for example, upon detecting expiration of a predefined time threshold associated with a respective content item and an indication to end a user session with the computer operating system.

In some implementations, the UI 100 may be reduced in response to a user or system 202 removing rendered content items from the UI 100. For example, if content items are removed by system 202 in response to expiring of the predefined time threshold. In another example, if the user removes content items from the UI 100, the system 202 may determine that the UI 100 may be reduced in size to provide the user with additional real estate for other content and applications outside of the UI 100.

Figure 16:
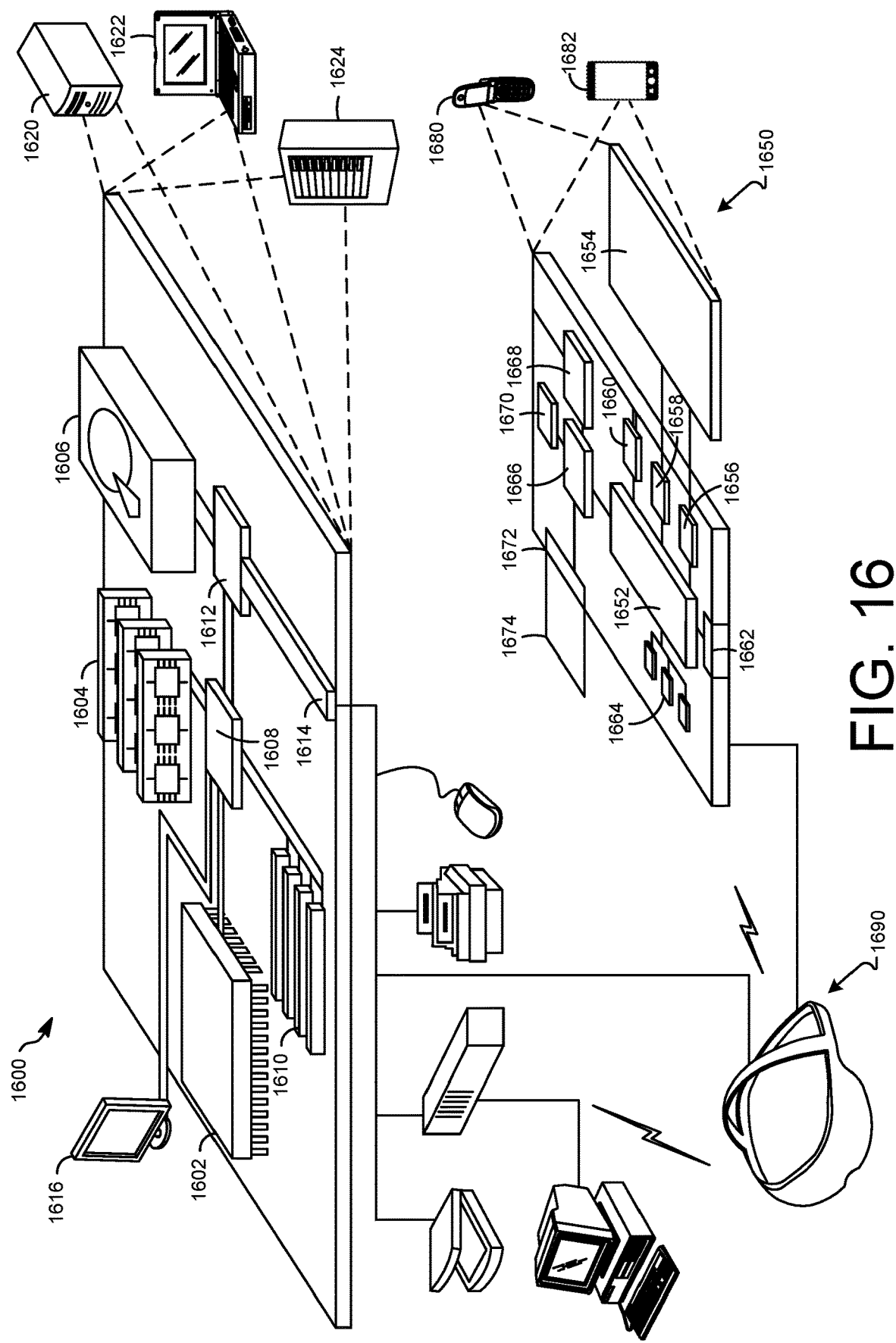
FIG. 16 shows an example of a computer device and a mobile computer device that can be used to implement the techniques described herein.

FIG. 16 shows an example of a computer device 1600 and a mobile computer device 1650, which may be used with the techniques described here. Computing device 1600 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. The processor 1602 can be a semiconductor-based processor. The memory 1604 can be a semiconductor-based memory. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk. In general, the computer-readable medium may be a non-transitory computer-readable medium.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provided as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wireles sly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, Wi-Fi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 16 can include sensors that interface with a virtual reality or headset (VR headset/AR headset/HMD device 1690). For example, one or more sensors included on computing device 1650 or other computing device depicted in FIG. 16, can provide input to AR/VR headset 1690 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 1650 can use the sensors to determine an absolute position and/or a detected rotation of the computing device in the AR/VR space that can then be used as input to the AR/VR space. For example, computing device 1650 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connect to, the computing device 1650 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1650 when the computing device is incorporated into the AR/VR space can cause a particular action to occur in the AR/VR space.

In some embodiments, one or more output devices included on the computing device 1650 can provide output and/or feedback to a user of the AR/VR headset 1690 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 1650 can be placed within AR/VR headset 1690 to create an AR/VR system. AR/VR headset 1690 can include one or more positioning elements that allow for the placement of computing device 1650, such as smart phone 1682, in the appropriate position within AR/VR headset 1690. In such embodiments, the display of smart phone 1682 can render stereoscopic images representing the AR/VR space or virtual environment.

In some embodiments, the computing device 1650 may appear as another object in a computer-generated, 3D environment. Interactions by the user with the computing device 1650 (e.g., rotating, shaking, touching a touchscreen, swiping a finger across a touch screen) can be interpreted as interactions with the object in the AR/VR space. As just one example, computing device can be a laser pointer. In such an example, computing device 1650 appears as a virtual laser pointer in the computer-generated, 3D environment. As the user manipulates computing device 1650, the user in the AR/VR space sees movement of the laser pointer. The user receives feedback from interactions with the computing device 1650 in the AR/VR environment on the computing device 1650 or on the AR/VR headset 1690.

In some embodiments, a computing device 1650 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method comprising:
generating a content repository to store content items satisfying a recency condition;
in response to receiving an indication to access and store an additional content item in the content repository:
triggering rendering of a user interface in a taskbar associated with a computer operating system, the user interface depicting at least a representation of the additional content item;
storing the additional content item in the content repository; and
triggering expansion of the user interface to include at least two regions, the at least two regions including a rendering of a representation of the content items stored in the content repository satisfying the recency condition and a representation of the additional content item.

2. The computer-implemented method of claim 1, wherein:
satisfying the recency condition includes detecting that a respective content item in the content items stored in the content repository is detected to be stored within a predefined threshold time period, and wherein the predefined threshold time period for the recency condition is configurable.

3. The computer-implemented method of claim 1, wherein the user interface is rendered and maintained as viewable while accessing one or more applications executing in the computer operating system.

4. The computer-implemented method of claim 1, wherein the at least two regions include at least:
a first region depicting the additional content item in response to detecting that the additional content item is requested to be pinned to the user interface; and
a second region depicting the additional content item in response to detecting that the additional content item includes a recent screen capture or a recent data download.

5. The computer-implemented method of claim 1, wherein:
the user interface is removed from view in response to detecting a select and drag operation for at least one content item associated with the user interface; and
the user interface reappears in view, in response to detecting a release of the at least one content item associated with the user interface.

6. The computer-implemented method of claim 1, wherein the content items satisfying the recency condition and the additional content item are configured to be selectable from the user interface to be provided as input into a document, an online document, or an application.

7. The computer-implemented method of claim 1, wherein the content items satisfying the recency condition and the additional content item are rendered in the user interface according to:
a temporal proximity of a copy operation or a cut operation associated with capturing the content item or the additional content item.

8. The computer-implemented method of claim 1, wherein the content items satisfying the recency condition and the additional content item are grouped in the user interface according to a detected object represented in content items associated with the user interface.

9. The computer-implemented method of claim 1, wherein the indication to access and store content includes a triggered drag-and-drop command, a triggered screen capture, a triggered image capture, or a triggered data download.

10. The computer-implemented method of claim 1, further comprising removing content items associated with the user interface upon detecting:
expiration of a predefined time threshold associated with a respective content item; and
an indication to end a user session with the computer operating system.

11. The computer-implemented method of claim 1, further comprising persisting a particular rendered content item in the user interface upon detecting a change in a file path associated with the particular rendered content item.

12. The computer-implemented method of claim 1, further comprising triggering reduction of the user interface based on removal of a particular rendered content item.

13. A non-transitory computer-readable storage medium comprising instructions stored thereon that, when executed by at least one processor, are configured to cause a computing system to carry out instructions including:
generating a content repository to store content items satisfying a recency condition, the content repository being modifiable by a computer operating system, but restricted to reading operations by applications executing in the computer operating system;
in response to receiving an indication to access and store an additional content item in the content repository:
triggering rendering of a user interface in a taskbar associated with the computer operating system, the user interface depicting at least a representation of the additional content item;
storing the additional content item in the content repository; and
triggering expansion of the user interface to include at least two regions, the at least two regions including a rendering of a representation of the content items satisfying the recency condition and a representation of the additional content item.

14. The non-transitory computer-readable storage medium of claim 13, wherein satisfying the recency condition includes detecting that a respective content item in the content items stored in the content repository is detected to be stored within a predefined time threshold , and wherein the predefined time threshold for the recency condition is configurable.

15. The non-transitory computer-readable storage medium of claim 13, wherein the at least two regions include at least:
a first region depicting the additional content item in response to detecting that the additional content item is requested to be pinned to the user interface; and
a second region depicting the additional content item in response to detecting that the additional content item includes a recent screen capture or a recent data download.

16. The non-transitory computer-readable storage medium of claim 13, wherein:
the user interface is removed from view in response to detecting a select and drag operation for at least one content item associated with the user interface; and
the user interface reappears in view, in response to detecting a release of the at least one content item associated with the user interface.

17. The non-transitory computer-readable storage medium of claim 13, wherein the content items satisfying the recency condition and the additional content item are configured to be selectable from the user interface to be provided as input into a document, an online document, or an application.

18. The non-transitory computer-readable storage medium of claim 13, wherein the content items satisfying the recency condition and the additional content item are grouped in the user interface according to:
   a temporal proximity of a copy operation or a cut operation associated with capturing the content items satisfying the recency condition or the additional content item.

19. The non-transitory computer-readable storage medium of claim 13, wherein the content items satisfying the recency condition and the additional content item are grouped in the user interface according to a detected object represented in content items associated with the user interface.

20. The non-transitory computer-readable storage medium of claim 13, wherein the indication to access and store content includes a triggered drag-and-drop command, a triggered screen capture, a triggered image capture, or a triggered data download.

21. A computing system comprising:
   a user interface module configured to:
      generate a content repository to store content items satisfying a recency condition; and
      in response to receiving an indication to access and store an additional content item in the content repository:
         trigger rendering of a user interface in a taskbar associated with a computer operating system, the user interface depicting at least a representation of the additional content item;
         store the additional content item in the content repository; and
         trigger expansion of the user interface to include at least two regions, the at least two regions including a rendering of a representation of the content items satisfying the recency condition and a representation of the additional content item.

22. The computing system of claim 21, wherein satisfying the recency condition includes detecting that a respective content item of the content items stored in the content repository is detected to be stored within a predefined time threshold, and wherein the predefined time threshold for the recency condition is configurable.

23. The computing system of claim 21, wherein the user interface is rendered and maintained as viewable while accessing one or more applications executing in the computer operating system.

24. The computing system of claim 21, wherein the at least two regions include at least:
   a first region depicting the additional content item in response to detecting that the additional content item is requested to be pinned to the user interface; and
   a second region depicting the additional content item in response to detecting that the additional content item includes a recent screen capture or a recent data download.

25. The computing system of claim 21, wherein:
   the user interface is removed from view in response to detecting a select and drag operation for at least one content item associated with the user interface; and
   the user interface reappears in view, in response to detecting a release of the at least one content item associated with the user interface.

* * * * *